(12) United States Patent
Meissner et al.

(10) Patent No.: US 11,693,085 B2
(45) Date of Patent: Jul. 4, 2023

(54) FMCW RADAR WITH INTERFERENCE SIGNAL SUPPRESSION

(71) Applicant: Infineon Technologies AG, Neubiberg (DE)

(72) Inventors: Paul Meissner, Feldkirchen bei Graz (AT); Alexander Melzer, Neutillmitsch (AT); Mate Andras Toth, Graz (AT)

(73) Assignee: Infineon Technologies AG, Neubiberg (DE)

( * ) Notice: Subject to any disclaimer, the term of this patent is extended or adjusted under 35 U.S.C. 154(b) by 604 days.

(21) Appl. No.: 16/656,726

(22) Filed: Oct. 18, 2019

(65) Prior Publication Data
US 2020/0124699 A1 Apr. 23, 2020

(30) Foreign Application Priority Data
Oct. 19, 2018 (DE) .......................... 102018126034.2

(51) Int. Cl.
| | | |
|---|---|---|
| G01S 7/02 | (2006.01) | |
| G01S 7/35 | (2006.01) | |
| G01S 13/02 | (2006.01) | |
| G01S 13/34 | (2006.01) | |
| G01S 13/00 | (2006.01) | |

(52) U.S. Cl.
CPC .............. *G01S 7/023* (2013.01); *G01S 7/354* (2013.01); *G01S 13/0209* (2013.01); *G01S 13/34* (2013.01); *G01S 7/358* (2021.05); *G01S 13/343* (2013.01)

(58) Field of Classification Search
CPC ........... G01S 7/023; G01S 7/356; G01S 7/352
USPC .......................................... 342/21, 192, 196
See application file for complete search history.

(56) References Cited

U.S. PATENT DOCUMENTS

| | | | | |
|---|---|---|---|---|
| 6,704,438 | B1 * | 3/2004 | Alexandru | ................ G06T 5/10 |
| | | | | 382/128 |
| 9,806,914 | B1 * | 10/2017 | Bordes | .................... H04J 11/004 |
| 9,952,312 | B2 * | 4/2018 | Corbett | .................... G01S 7/023 |

(Continued)

FOREIGN PATENT DOCUMENTS

| | | | | | |
|---|---|---|---|---|---|
| EP | 3173812 | A1 * | 5/2017 | ............. | G01S 7/023 |
| EP | 3244229 | A1 * | 11/2017 | ............. | G01S 7/023 |
| EP | 3489710 | A1 * | 5/2019 | ............. | G01S 7/023 |

OTHER PUBLICATIONS

J. Smith, III, "Mathematics of the Discrete Fourier Transform (DFT), with Audio Applications," second edition; section with the header "Positive and Negative Frequencies"; W3K Publishing; ISBN 978-0-9745607-4-8; published 2007; section posted on the author's internet page at Stanford University. (Year: 2007).*

(Continued)

*Primary Examiner* — Bernarr E Gregory
(74) *Attorney, Agent, or Firm* — Harrity & Harrity, LLP

(57) ABSTRACT

A method is described that can be used in a radar system. In accordance with one exemplary embodiment, the method includes calculating a first spectrum, which represents a spectrum of a segment of a complex baseband signal. The segment is assignable to a specific chirp of a chirp sequence contained in a first RF radar signal. The method further includes estimating a second spectrum, which represents a spectrum of an interference signal contained in the complex baseband signal, based on a portion of the first spectrum that is assigned to negative frequencies.

21 Claims, 11 Drawing Sheets

(56) References Cited

U.S. PATENT DOCUMENTS

| 10,078,131 B2* | 9/2018 | Rao .......................... G01S 7/352 |
|---|---|---|
| 2006/0125682 A1* | 6/2006 | Kelly, Jr. ................. G01S 7/023 |
| | | 342/134 |
| 2018/0074168 A1* | 3/2018 | Subburaj ............... G01S 13/003 |
| 2019/0129026 A1* | 5/2019 | Sumi ................... G01S 7/52033 |

OTHER PUBLICATIONS

Murali, Sriram, et al. "Interference Detection in FMCW Radar Using A Complex Baseband Oversampled Receiver", 2018 IEEE Radar Conference (RadarConf18), Apr. 23-27, 2018, pp. 1567-1572.

* cited by examiner

FMCW RADAR WITH INTERFERENCE SIGNAL SUPPRESSION

RELATED APPLICATION

This application claims priority to German Patent Application No. 102018126034.2, filed on Oct. 19, 2018, which is incorporated herein by reference in its entirety.

FIELD

The present description relates to the field of radar sensors, in particular to signal processing methods which are used in radar sensors and which enable disturbing interference to be suppressed.

BACKGROUND

Radar sensors are used in a multiplicity of applications for detecting objects, wherein the detecting usually comprises measuring distances and speeds of the detected objects. In the automotive field, in particular, there is an increasing need for radar sensors which can be used, inter alia, in driving assistance systems (e.g. Advanced driver assistance systems (ADAS)) such as e.g. in cruise control (e.g., Adaptive Cruise Control (ACC) or Radar Cruise Control) systems. Such systems can automatically adapt the speed of an automobile in order thus to maintain a safe distance from other automobiles ahead (and also other objects and pedestrians). Further applications in the automotive field are e.g. blind spot detection, lane change assist and the like. In the field of autonomous driving, radar sensors will play an important part for the control of autonomous vehicles.

Since automobiles are increasingly being equipped with radar sensors, there is an increasing probability of interference. That is to say that a radar signal emitted by a first radar sensor (incorporated into a first vehicle) can be picked up by the receiving antenna of a second radar sensor (incorporated into a second vehicle). In the second radar sensor, the first radar signal can interfere with an echo of the second radar signal and thereby impair the operation of the second radar sensor

SUMMARY

A method is described below which can be used in a radar system. In accordance with one exemplary embodiment, the method includes calculating a first spectrum, which represents a spectrum of a segment of a complex baseband signal (complex-valued baseband signal). The segment is assignable to a specific chirp of a chirp sequence contained in a first RF radar signal. The method further includes estimating a second spectrum, which represents a spectrum of an interference signal contained in the complex baseband signal, based on a portion of the first spectrum which is assigned to negative frequencies.

In accordance with another exemplary embodiment, the method includes calculating a first spectrum, which represents a spectrum of a segment of a baseband signal. The segment is assigned to a specific chirp of a chirp sequence contained in a first RF radar signal. The method further includes identifying spectral lines which can be assigned to a radar echo, and determining a second spectrum, which represents an estimated value for the spectrum of an interference signal contained in the baseband signal, based on the first spectrum. In this case, those spectral lines which can be assigned to a radar echo are disregarded.

Furthermore, a radar device is described. In accordance with one exemplary embodiment, the radar device includes a radar transceiver having an oscillator and a receiving channel. The oscillator is configured to generate a first RF radar signal containing a chirp sequence. The receiving channel is configured to generate a complex baseband signal including a multiplicity of segments, wherein each segment is respectively assigned to a chirp of the chirp sequence. The device further includes a computing unit configured to calculate a first spectrum, which represents a spectrum of a segment of the complex baseband signal, and to estimate a second spectrum, which represents a spectrum of an interference signal contained in the complex baseband signal, based on a portion of the first spectrum which is assigned to negative frequencies.

In accordance with another exemplary embodiment, the radar device includes a radar transceiver having an oscillator and having a receiving channel. The oscillator is configured to generate a first RF radar signal containing a chirp sequence. The receiving channel is configured to generate a baseband signal, wherein the baseband signal includes a multiplicity of segments and each segment is assigned to a specific chirp of the chirp sequence. The device further includes a computing unit configured to calculate a first spectrum, which represents a spectrum of a segment of the baseband signal, to identify spectral lines which can be assigned to a radar echo, and to determine a second spectrum, which represents an estimated value for the spectrum of an interference signal contained in the baseband signal, based on the first spectrum. In this case, those spectral lines which can be assigned to a radar echo are disregarded.

BRIEF DESCRIPTION OF THE DRAWINGS

Exemplary embodiments are explained in greater detail below with reference to figures. The illustrations are not necessarily true to scale and the exemplary embodiments are not restricted only to the aspects illustrated. Rather, importance is assigned to illustrating the principles underlying the exemplary embodiments. In the figures.

DETAILED DESCRIPTION

Figure 1:
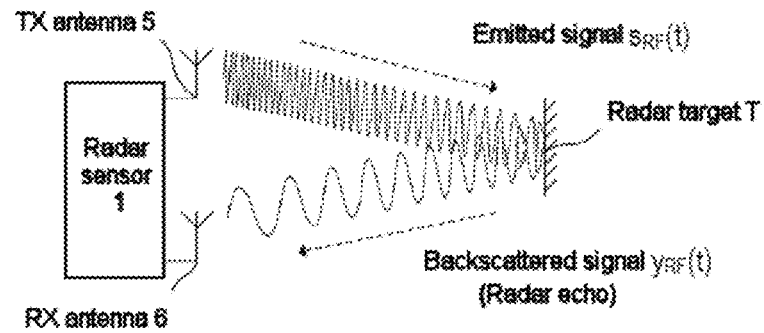
FIG. 1 is a schematic diagram for illustrating the functional principle of an FMCW radar system for distance and/or speed measurement.

FIG. 1 illustrates, in a schematic diagram, the application of a frequency-modulated continuous-wave radar system—usually referred to as FMCW: radar system—as sensor for the measurement of distances and speeds of objects, which are usually referred to as radar targets. In the present example, the radar device 1 comprises separate transmitting (TX) and receiving (RX) antennas 5 and 6 respectively (bistatic or pseudo-monostatic radar configuration). It should be noted, however, that a single antenna can also be used, which serves simultaneously as transmitting antenna and as receiving antenna (monostatic radar configuration). The transmitting antenna 5 emits a continuous RF signal $s_{RF}(t)$, which is frequency-modulated for example with a type of sawtooth signal (periodic, linear frequency ramp). The emitted signal $s_{RF}(t)$ is backscattered at the radar target T and the backscattered/reflected signal $y_{RF}(t)$ (echo signal) is received by the receiving antenna 6. FIG. 1 shows a simplified example; in practice, radar sensors are systems comprising a plurality of transmitting (TX) and receiving (RX) channels in order also to be able to determine the angle of incidence (Direction of Arrival, DoA) of the backscattered/reflected signal $y_{RF}(t)$ and thus to be able to localize the radar target T more accurately.

Figure 2:
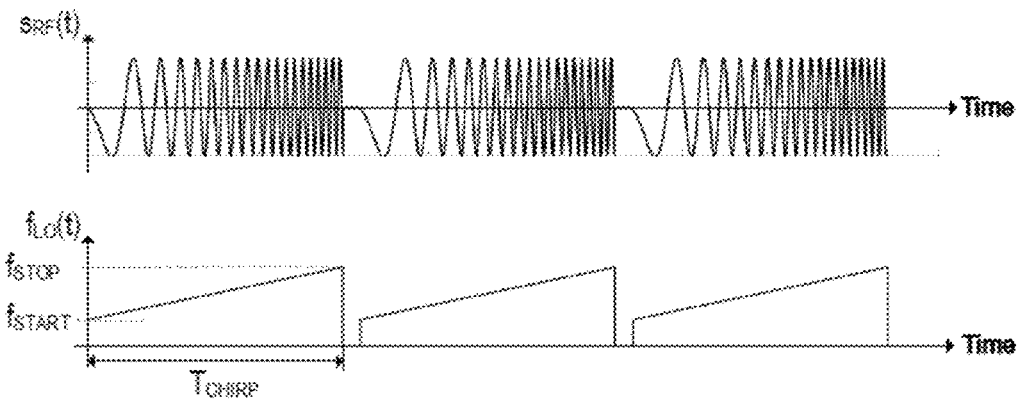
FIG. 2 comprises two timing diagrams for illustrating the frequency modulation (FM) of the RF signal generated by the FMCW system.

FIG. 2 illustrates by way of example the abovementioned frequency modulation of the signal $s_{RF}(t)$, As illustrated in FIG. 2 (upper diagram), the emitted RF signal $s_{RF}(t)$ is composed of a set of "chirps", that is to say that the signal $s_{RF}(t)$ comprises a sequence of sinusoidal signal profiles (waveforms) having a rising frequency (up-chirp) or a falling frequency (down-chirp). In the present example, the instantaneous frequency f(t) of a chirp beginning at a start frequency $f_{START}$ rises linearly within a time period $T_{RAMP}$ to a stop frequency $f_{STOP}$ (see lower diagram in FIG. 2). Such chirps are also referred to as linear frequency ramps. FIG. 2 illustrates three identical linear frequency ramps. It should be noted, however, that the parameters $f_{START}$, $f_{STOP}$, $T_{RAMP}$ and also the pause between the individual frequency ramps can vary. The frequency variation also need not necessarily be linear (linear chirp). Depending on the implementation, transmission signals with exponential or hyperbolic frequency variation (exponential or hyperbolic chirps, respectively) can also be used, for example.

Figure 3:
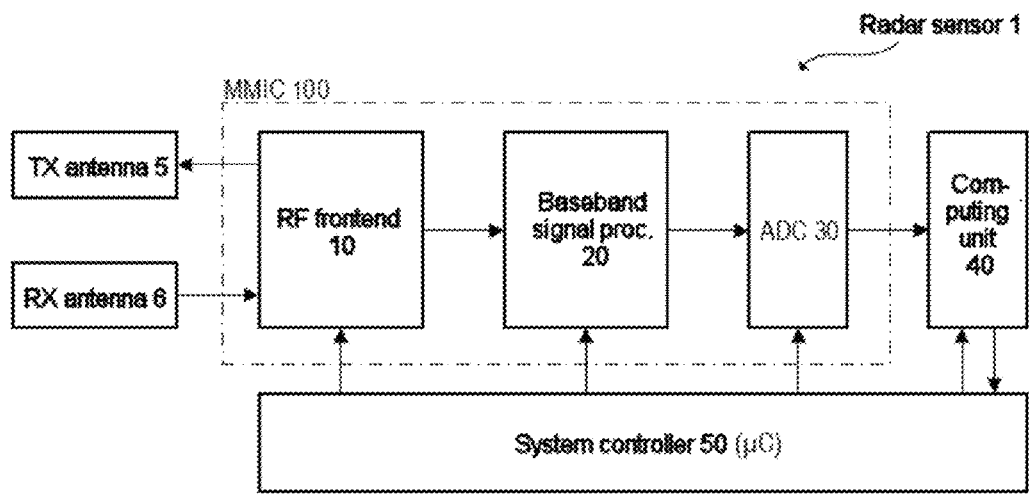
FIG. 3 is a block diagram for illustrating the fundamental structure of an FMCW radar system.

FIG. 3 is a block diagram which illustrates one possible structure of a radar device 1 (radar sensor) by way of example. Accordingly, at least one transmitting antenna 5 (TX antenna) and at least one receiving antenna 6 (RX antenna) are connected to an RE frontend 10 which is integrated in a chip and which can include all those circuit components which are required for the RF signal processing. Said circuit components comprise for example a local oscillator (LO), RF power amplifiers, low-noise amplifiers (LNAs), directional couplers (e.g. rat race couplers, circulators, etc.) and mixers for the down-conversion of the RF signals into baseband or an intermediate frequency band (IF band). The RE front end 10—if appropriate together with further circuit components—can be integrated in a chip, which is usually referred to as a monolithic microwave integrated circuit (MMIC). Hereinafter, no further distinction is drawn between baseband and IF band and only the term baseband is used. Baseband signals are those signals on the basis of which the detection of radar targets is carried out.

The example illustrated shows a bistatic (or pseudo-monostatic) radar system comprising separate RX and TX antennas. In the case of a monostatic radar system, the same antenna would be used both for emitting and for receiving the electromagnetic (radar) signals. In this case, a directional coupler (e.g. a circulator) can be used to separate the RF signals to be emitted from the RE signals (radar echo signals) received. As mentioned, radar systems in practice usually comprise a plurality of transmitting and receiving channels having a plurality of transmitting and receiving antennas, respectively, which makes it possible, inter alia, to measure the direction (DoA) from which the radar echoes are received. In MIMO systems of this type, the individual TX channels and RX channels are usually constructed identically or similarly in each case.

In the case of an FMCW radar system, the RF signals emitted via the TX antenna 5 can lie e.g. in the range of approximately 20 GHz to 100 GHz (e.g. around 77 GHz in some applications). As mentioned, the RF signal received by the RX antenna 6 comprises the radar echoes (chirp echo signals), i.e. those signal components which are backscattered at one or at a plurality of radar targets. The received RF signal $y_{RF}(t)$ is e.g. down-converted to baseband (or an IF band) and processed further in baseband by means of analog signal processing (see FIG. 3, analog baseband signal processing chain 20). The analog signal processing mentioned substantially comprises filtering and, if appropriate, amplification of the baseband signal. The baseband signal is finally digitized (see FIG. 3, analog-to-digital converter 30) and processed further in the digital domain. The digital signal processing chain can be realized at least partly as software which can be executed on a processor, for example a microcontroller or a digital signal processor (see FIG. 3, computing unit 40). The overall system is generally controlled by means of a system controller 50, which can likewise be implemented at least partly as software which is executed on a processor such as e.g. a microcontroller. The RF frontend 10 and the analog baseband signal processing chain 20 (optionally also the analog-to-digital converter 30 and the computing unit 40) can be totally integrated in a single MMIC (i.e. an RF semiconductor chip). Alternatively, the individual components can also be distributed among a plurality of integrated circuits.

Figure 4:
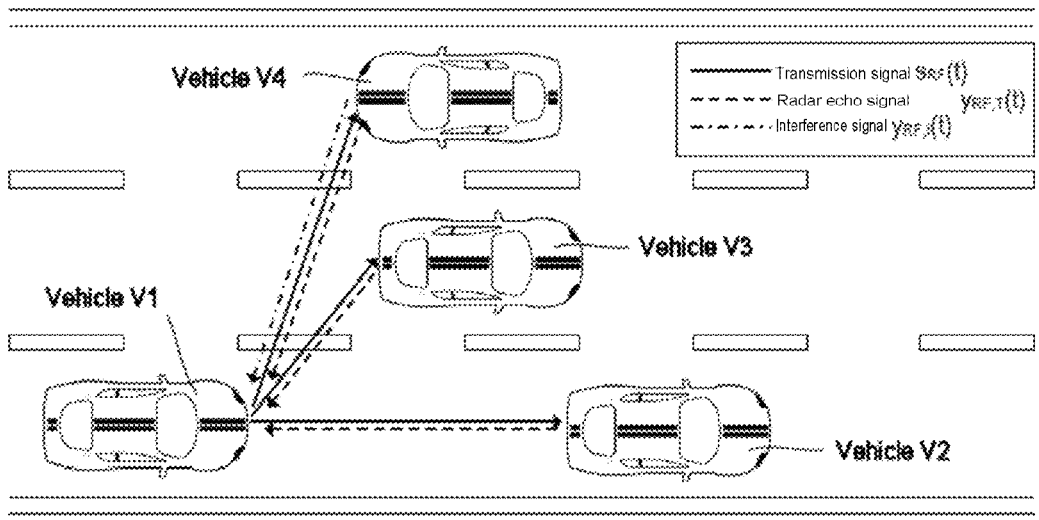
FIG. 4 is a schematic diagram for illustrating an example of how interference signals can be picked up by the receiving antenna of a radar sensor.
Figure 7:
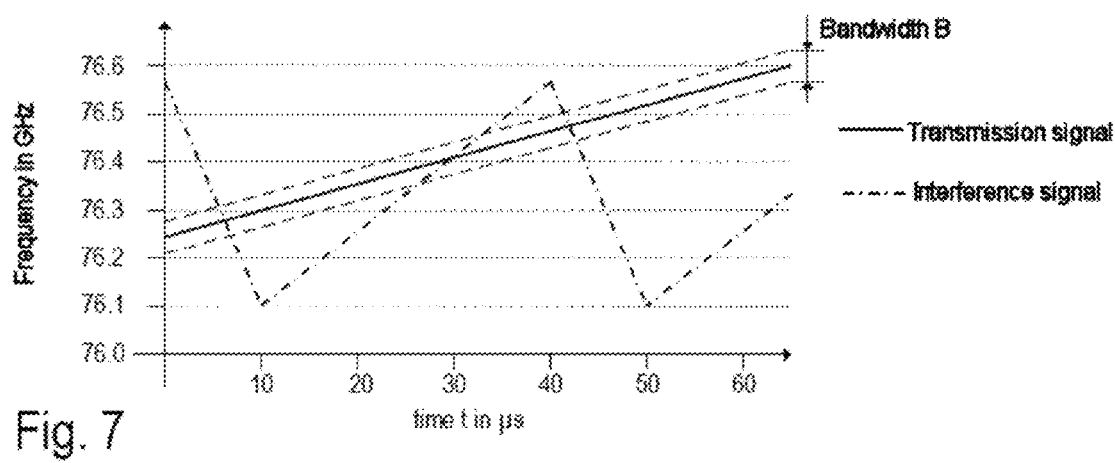
FIG. 7 shows a timing diagram of a transmission signal of a radar sensor and an interference-causing transmission signal (interference signal) of a further radar sensor (interferer), wherein the signal profiles (frequency versus time) of these signals partly overlap.

FIG. 4 illustrates a simple example for illustrating how an interferer can interfere with the received radar echoes. FIG. 7 illustrates a road with three lanes and four vehicles V1, V2, V3 and V4. At least the vehicles V1 and V4 are equipped with radar sensors. The radar sensor of the vehicle V1 emits an RF radar signal $s_{RF}(t)$ and the received RF radar signal $y_{RF}(t)$ includes the radar echoes from the vehicles V2 and V3 ahead and also from the oncoming vehicle V4. Furthermore, the RF radar signal $y_{RF}(t)$ received by the radar sensor of the vehicle V1 includes a radar signal (interference signal) that was generated by the radar sensor of the oncoming vehicle V4. The radar sensor of the vehicle V4 is an interferer for the radar sensor of the vehicle V1.

The signal $y_{RF}(t)$ received by the radar sensor of the vehicle V1 can be written as follows:

$$y_{RF}(t) = y_{RF,T}(t) + y_{RF,I}(t), \text{ wherein} \quad (1)$$

$$y_{RF,T}(t) = \sum_{i=0}^{U-1} A_{T,i} \cdot s_{RF}(t - \Delta t_{T,i}) \text{ and} \quad (2)$$

$$y_{RF,I}(t) = \sum_{k=0}^{V-1} A_{I,k} \cdot s'_{RF,k}(t - \Delta t_{I,k}). \quad (3)$$

In equations (1) to (3) above, the signal components $y_{RF,T}(t)$ and $y_{RF,I}(t)$ of the received signal $y_{RF}(t)$ correspond to the radar echoes from real radar targets $T_i$ or to the interference signals. In practice, a plurality of radar echoes and a plurality of interferers may be present. Equation (2) therefore represents the sum of the radar echoes caused by U different radar targets $T_i$, wherein $A_{T,i}$ denotes the damping of the emitted radar signal and $\Delta t_{T,i}$ denotes the round trip delay time (RTDT) for a specific radar target $T_i$. Equation (3) equally represents the sum of the interference signals caused by V interferers. In this case, $A_{I,k}$ denotes the damping of the interference signal $s_{RF,k}'(t)$ emitted by an interferer and $\Delta t_{I,k}$ denotes the associated signal propagation time (for each interferer k=0, 1, ..., V−1). It should be noted that the radar signal $s_{RF}(t)$ emitted by the vehicle V1 and the interference signal $s_{RF,0}'(t)$ emitted by the vehicle V4 (index k=0 for vehicle V4) will generally have different chirp sequences having different chirp parameters (start/stop frequency, chirp duration, repetition rate, etc.). Furthermore, the amplitude of the received interference signal component $y_{RF,I}(t)$ may be significantly higher than the amplitude of the echo signal component $y_{RF,T}(t)$.

Figure 5:
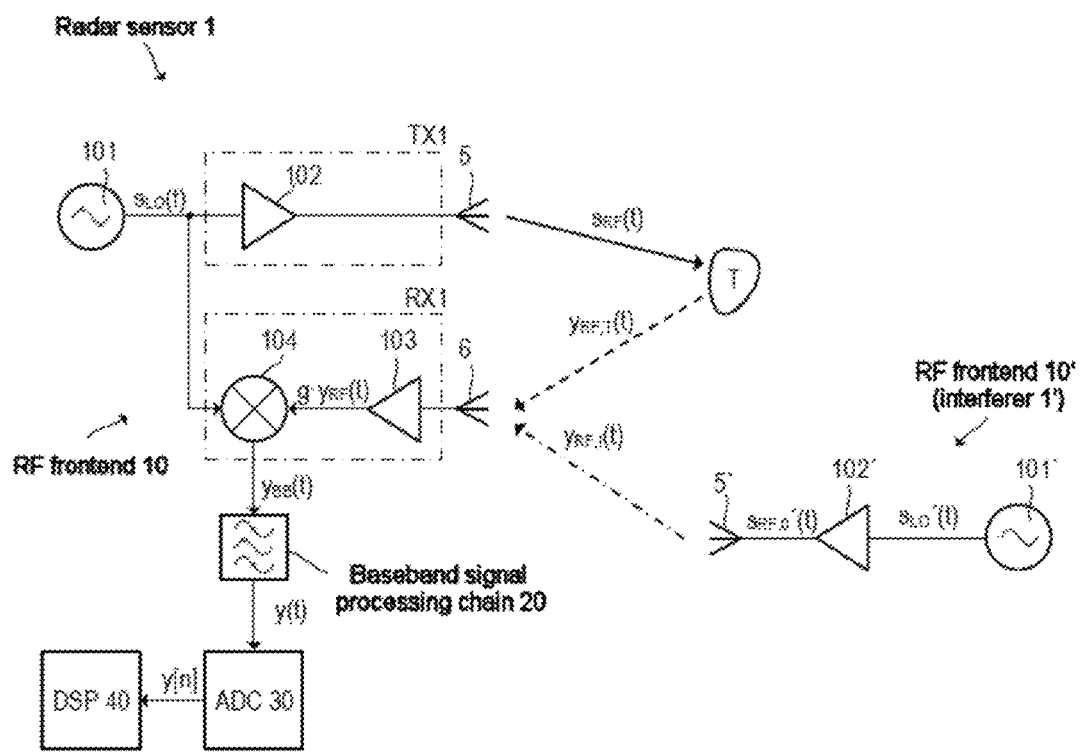
FIG. 5 is a circuit diagram for illustrating a simplified example of a radar transceiver and of a further radar transceiver that causes interference.

FIG. 5 illustrates one exemplary implementation of a radar transceiver 1 in accordance with the example from FIG. 3 in greater detail. The present example illustrates in particular the RF frontend 10 of the radar transceiver 1 and the RE frontend 10' of a different (interfering) radar sensor 1'. It should be noted that FIG. 5 illustrates a simplified circuit diagram in order to show the fundamental structure of the RE frontend 10 with one transmitting channel (TX channel) and one receiving channel (RX channel). Actual implementations, which may depend greatly on the specific application, are usually more complex and comprise a plurality of TX and/or RX channels.

The RF frontend 10 comprises a local oscillator 101 (LO), which generates an RF oscillator signal $s_{LO}(t)$. The RF oscillator signal $s_{LO}(t)$ is frequency-modulated during operation, as described above with reference to FIG. 2, and is also referred to as LO signal. In radar applications, the LO signal usually lies in the SHF (Super High Frequency, centimeter-wave) or in the EHT (Extremely High Frequency, millimeter-wave) band, e.g. in the interval of 76 GHZ to 81 GHz in some automotive applications. The LO signal $s_{LO}(t)$ is processed both in the transmission signal path TX1 (in the TX channel) and in the reception signal path RX1 (in the RX channel).

The transmission signal $s_{RF}(t)$ (cf. FIG. 2), emitted by the TX antenna 5, is generated by amplifying the LO signal $s_{LO}(t)$, for example by means of the RF power amplifier 102, and is thus merely an amplified and possibly phase-shifted version of the LO signal $s_{LO}(t)$. The output of the amplifier 102 can be coupled to the TX antenna 5 (in the case of a bistatic or pseudo-monostatic radar configuration), The reception signal $y_{RF}(t)$ received by the RX antenna 6 is fed to the receiver circuit in the RX channel and thus directly or indirectly to the RF port of the mixer 104. In the present example, the RF reception signal $y_{RF}(t)$ (antenna signal) is preamplified by means of the amplifier 103 (gain g). The mixer 104 thus receives the amplified RE reception signal $g \cdot y_{RF}(t)$. The amplifier 103 can be e.g. an LNA. The LO signal $s_{LO}(t)$ is fed to the reference port of the mixer 104, such that the mixer 104 down-converts the (preamplified) RF reception signal $y_{RF}(t)$ to baseband. The down-converted baseband signal (mixer output signal) is designated by $y_{BB}(t)$. Said baseband signal $y_{BB}(t)$ is firstly processed further in analog fashion, wherein the analog baseband signal processing chain 20 substantially brings about amplification and (e.g. bandpass or low-pass) filleting in order to suppress undesired sidebands and image frequencies. The resulting analog output signal, which is fed to an analog-to-digital converter (see FIG. 3, ADC 30), is designated by y(t). Methods for the digital further processing of the digitized output signal (digital radar signal y[n]) are known per se (for example range Doppler analysis) and therefore will not be discussed in further detail here.

In the present example, the mixer 104 down-converters the preamplified RF reception signal $g \cdot y_{RF}(t)$ (i.e. the amplified antenna signal) to baseband. The mixing can take place in one stage (that is to say from the RE band directly to baseband) or via one or more intermediate stages (that is to say from the RF band to an intermediate frequency band and further to baseband). In this case, the reception mixer 104 effectively comprises a plurality of individual mixer stages connected in series. In view of the example shown in FIG. 5, it becomes clear that the quality of a radar measurement depends greatly on the quality of the LO signal $s_{LO}(t)$, for example on the noise contained in the LO signal $s_{LO}(t)$, which noise is quantitatively determined by the phase noise of the local oscillator 101.

FIG. 5 furthermore shows a portion (the TX channel of the RF frontend 10') of a further radar sensor 1', which constitutes an interferer for the radar sensor 1. The RF frontend 10' of the radar sensor 1' includes a further local oscillator 101', which generates an LO signal $s_{LO}'(t)$, which is amplified by the amplifier 102'. The amplified LO signal is emitted as RF radar signal $s_{RF,0}'(t)$ via the antenna 5' of the radar sensor 1' (cf. equation (3)). This RF radar signal $s_{RF,0}'(t)$ contributes to the interference signal component $y_{RF,I}(t)$ received by the antenna 6 of the other radar sensor 1 and causes the interference mentioned.

Figure 6:
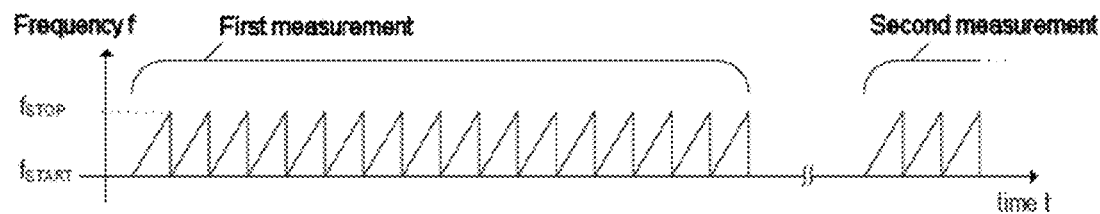
FIG. 6 shows, in a timing diagram (frequency versus time), one example of an emitted radar signal having a plurality of sequences of chirps, wherein each sequence has a specific number of chirps which are used for a measurement.

FIG. 6 schematically illustrates one example of an scheme such as is usually used during the frequency modulation of the LO signal $s_{LO}(t)$ in FMCW radar sensors. In the example illustrated, a sequence of chirps is generated for each measurement. In FIG. 6, the first sequence contains only 16 chirps; in practice, however, a sequence will have significantly more chirps, for example 128 or 256 chirps. A number corresponding to a power of two allows the use of efficient FFT (Fast Fourier Transform) algorithms during the subsequent digital signal processing (e.g. during the range Doppler analysis). There may be a pause between the individual sequences.

Figure 8:
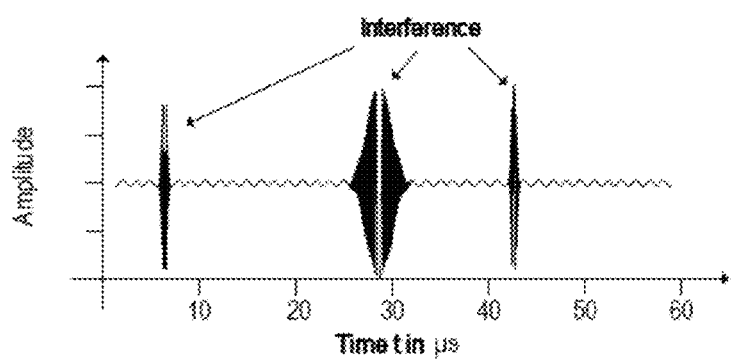
FIG. 8 shows a timing diagram of an exemplary signal profile of a radar signal (after mixing into baseband) including a radar echo from a radar target and an interference signal (interference)

FIGS. 7 and 8 illustrate, on the basis of one example, how an interferer can interfere with the radar echoes contained in the RF signal $y_{RF}(t)$ received by the radar sensor 1. FIG. 7 shows, in a diagram (frequency versus time), a chirp emitted by the radar signal 1 and having a chirp duration of 60 µs. The start frequency of the emitted signal $s_{RF}(t)$ is approximately 76250 MHz and the stop frequency is approximately 76600 MHz. An interference signal $y_{RF,I}(t)$ generated by a different radar sensor includes an up-chirp having a start frequency of approximately 76100 MHz, a stop frequency of approximately 76580 MHz and a chirp duration of 30 µs, and a succeeding down-chirp that starts at the stop frequency of the preceding chirp and ends at the start frequency of the preceding chirp and has a chirp duration of 10 µs. The bandwidth of the baseband signal of the radar sensor is substantially determined by the baseband signal processing chain 20 and is indicated by the dashed lines in FIG. 7. FIG. 8 shows one exemplary signal profile of the (preprocessed) baseband signal y(t) of the radar sensor 1. It can be seen that the signal components on account of the interference have a significant amplitude in that time interval in which the frequency of the interference signal lies within the bandwidth B of the radar sensor (see FIGS. 7 and 8). In the present example, the interference occurs three times during the chirp duration of 60 µs, namely at approximately 7 µs, 28 µs and 42 µs. As mentioned, the power of the interference signal can be higher than the power of the radar echoes from real targets. Furthermore (apart from exceptions not considered here) the interference signals and the transmission signal of the radar sensor 1 considered are uncorrelated, for which reason the interference can be regarded as noise and thus increases the noise floor.

Figure 9:
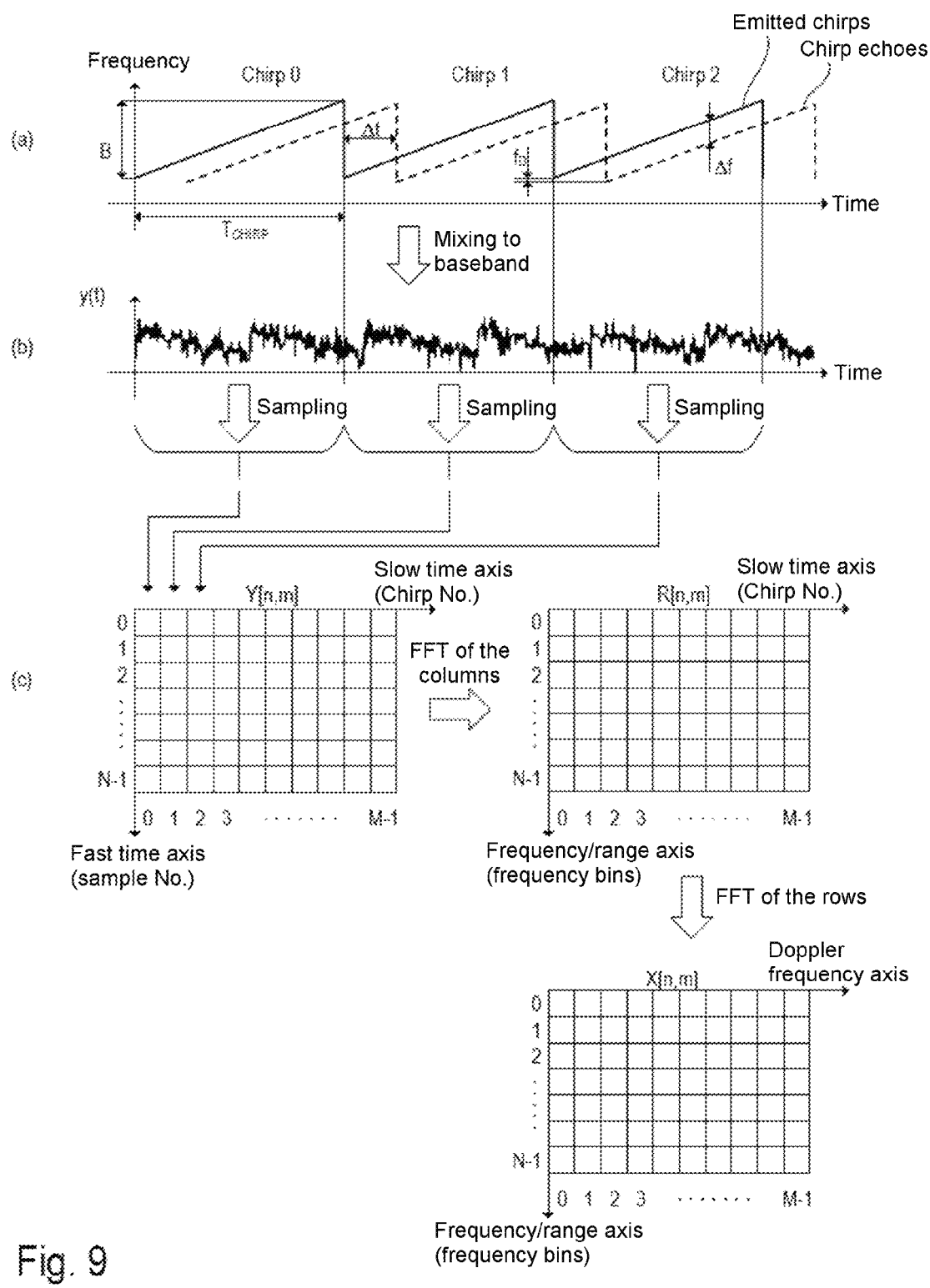
FIG. 9 illustrates by way of example the digital signal processing of radar signals during range Doppler analysis.

Before the interference signal suppression is discussed in greater detail, the signal processing usually carried out for detecting radar targets in a radar sensor will be briefly summarized below. FIG. 9 illustrates, on the basis of one example, the analog signal processing in a radar sensor through to the digitization of the baseband signal representing the chirp echo signals. Diagram (a) from FIG. 9 shows part of a chirp sequence comprising M linear chirps. The solid line represents the signal profile (waveform frequency versus time) of the outgoing RF radar signal $s_{RF}(t)$ and the dashed line represents the corresponding signal profile of the incoming radar signal $y_{RF}(t)$, which comprises (if present) the chirp echoes. In accordance with diagram (a) in FIG. 9, the frequency of the outgoing radar signal, beginning at a start frequency $f_{START}$, rises linearly up to a stop frequency $f_{STOP}$ (chirp No. 0) and then falls back to the start frequency $f_{START}$, rises again up to the stop frequency $f_{STOP}$ (chirp No. 0, and so on.

As explained above with reference to FIG. 6, a chirp sequence comprises a multiplicity of chirps; in the present case, the number of chirps in a sequence is designated by M. Depending on the application, a sequence can also include chirps having different parameters (start and stop frequency, duration and modulation pause). During a modulation pause between two successive chirps, the frequency can be e.g. equal to the stop frequency of the previous chirp or to the start frequency of the subsequent chirp (or equal to some other frequency). The chirp duration can lie in the range of from a few microseconds to a few milliseconds, for example in the range of 20 µs to 2 ms. The actual values can also be larger or smaller depending on the application. The number M of chirps in a sequence can correspond to a power of two, e.g. M=256.

The incoming RF radar signal $y_{RF}(t)$ (i.e. that which is received by the RX antenna) lags behind the outgoing RF radar signal $s_{RF}(t)$ (i.e. that which is emitted by the TX antenna) by a time difference Δt. This time difference Δt corresponds to the signal propagation time from the TX antenna, to the radar target and back to the RX antenna and is also referred to as the Round Trip Delay Time (RTDT). The distance $d_{T_i}$ between a radar target $T_i$ and the radar sensor is $d_T=c\cdot\Delta t/2$, i.e. the speed of light c times half the time difference Δt. As can be seen in diagram (a) in FIG. 9, the time difference Δt results in a corresponding frequency difference Δf. This frequency difference Δf can be determined by mixing the incoming (and possibly preamplified) radar signal $y_{RF}(t)$ with the LO signal $s_{LO}(t)$ of the radar sensor (see FIG. 5, mixer 104), digitizing the resulting baseband signal y(t) and then carrying out a digital spectral analysis. The frequency difference Δf then appears as a beat frequency in the spectrum of the digitized baseband signal y[n]. If linear chirps are used, the time difference Δt can be calculated in accordance with Δt=Δf/k, wherein the factor k denotes the gradient (hertz per second) of the frequency ramp, and can be calculated in accordance with $k=B/T_{CHIRP}$, wherein B is the bandwidth of a chirp ($B=|f_{STOP}-f_{START}|$). In view of the explanations above, it follows for the sought distance $d_{T_i}$ of the target $T_i$ that:

$$d_{T_i}=c\cdot\Delta t/2=c\cdot\Delta f\cdot T_{CHIRP}/(2\cdot B) \quad (4)$$

Although the basic functional principle of an FMCW radar sensor has been summarized above, it should be noted that more demanding signal processing is usually employed in practice. By way of example, an additional Doppler shift $f_D$ in the incoming signal on account of the Doppler effect can influence the distance measurement since the Doppler shift $f_D$ is added to the frequency difference Δf explained above. Depending on the application, the Doppler shift can be estimated/calculated from the outgoing and incoming radar signals and can be taken into account in the measurement, whereas in some applications the Doppler shift may be negligible for the distance measurement. That may be the case e.g. if the chirp duration is high and the speed of the target is low, such that the frequency difference Δf is large in comparison with the Doppler shift $f_D$. In some radar systems, the Doppler shift can be eliminated by determining the distance on the basis of an up-chirp and a down-chirp during the distance measurement. Theoretically, the actual distance $d_T$ can be calculated as a mean value of the distance values obtained from a measurement with up-chirps and a further measurement with down-chirps. The Doppler shift is eliminated by the averaging.

One example of a signal processing technique for the processing of FMCW radar signals includes the calculation of so-called range Doppler maps, which are also referred to as range Doppler images. In general, FMCW radar sensors determine the target information distance, speed, DoA) by emitting a sequence of chirps (see FIG. 9, diagram (a)) and mixing the (delayed) Times from the radar targets with a "copy" of the emitted signal (cf. FIG. 5, mixer 104). The resulting baseband signal y(t) is illustrated in diagram (b) in FIG. 9. This baseband signal y(t) can be subdivided into a plurality of segments, wherein each segment of the baseband signal y(t) is assigned to a specific chirp of the chirp sequence.

The target information mentioned can be extracted from the spectrum of the abovementioned segments of the baseband signal y(t) which contain the chirp echoes generated by one or more radar targets. As explained in greater detail below, a range Doppler map is obtained by means of a two-stage Fourier transformation, for example. Range Doppler maps can be used as a basis for various methods for detection, identification and classification of radar targets. The result of the first Fourier transformation stage is referred to as a range map. The interference signal suppression methods described here can be carried out in the spectra of the abovementioned segments of the baseband signal which are contained in such a range map.

In the examples illustrated here, the calculations required for determining the range Doppler maps are carried out by a digital computing unit such as e.g. a signal processor (cf. FIG. 5, DSP 40). In other exemplary embodiments, in addition or as an alternative to a signal processor, other computing units can also be used to carry out the required calculations. Depending on the implementation, the calculations can be carried out by various software and hardware units (software and hardware entities) or combinations thereof. In general, the term computing unit is understood here to mean any desired combination of software and hardware which is able and configured to carry out the calculations described in association with the exemplary embodiments explained here.

In accordance with one exemplary implementation, the calculation of a range Doppler map includes two stages, wherein a plurality of Fourier transformations are calculated (e.g. by means of an FFT algorithm) in each stage. In accordance with the present example, the baseband signal y(t) (cf. FIG. 5) is sampled such that N×M samples are obtained for a chirp sequence having M chirps, i.e. M segments with N samples in each case. That is to say that the sampling time interval $T_{SAMPLE}$ is chosen such that each of the M segments (chirp echoes in baseband) is represented by a sequence of N samples. As illustrated in diagram (c) in FIG. 9, said M segments each associated with N samples can be arranged in a two-dimensional array Y[n, m] (radar data array). Each column of the array Y[n, m] represents one of the M considered segments of the baseband signal y(t), and the n-th row of the array Y[n, m] contains the n-th sample of the M chirps. The row index n (n=0, 1, . . . N−1) can thus be regarded as a discrete point in time n·$T_{SAMPLE}$ on a "fast" time axis. Equally the column index in (m=0, 1, . . . M−1) can be regarded as a discrete point in time m·$T_{CHIRP}$ on a "slow" time axis. The column index m corresponds to the number of the chirp in a chirp sequence.

In a first stage, a first FFT (usually referred to as range FFT) is applied to each chirp. The Fourier transformation is calculated for each column of the array Y[n, m]. In other words, the array Y[n, m] is Fourier-transformed along the fast time axis, and the result obtained is a two-dimensional array R[k, m] of spectra, which is referred to as a range map, wherein each of the M columns of the range map contains in each case N (complex-valued) spectral values. As a result of the Fourier transformation, the "fast" time axis becomes the frequency axis; the row index k of the range map R[k, m] corresponds to a discrete frequency and is thus also referred to as a frequency bin. Each discrete frequency corresponds to a distance in accordance with equation 4, for which reason the frequency axis is also referred to as a distance axis (Range Axis).

The range map R[k, m] is illustrated in diagram (c) in FIG. 9. A radar echo caused by a radar target results in a local maximum (Peak) at a specific frequency index/frequency bin. Said local maximum usually appears in all the columns of the range map R[k, m], i.e. in the spectra of all considered segments of the baseband signal y(t) which can be assigned to the chirps of a chirp sequence. As mentioned, the associated frequency index k (e.g. in accordance with equation 4) can be converted into a distance value.

In a second stage, a second FFT (usually referred to as Doppler FFT) is applied to each of the N rows of the range map R[k, in] (k=0, . . . , N−1). Each row of the range map R[k, m] includes M spectral values of a specific frequency bin, wherein each frequency bin corresponds to a specific distance $d_{Ti}$ of a specific radar target $T_i$. The Fourier transformation of the spectral values in a specific frequency bin (assignable to a radar target) makes it possible to determine the associated Doppler shift $f_D$, corresponding to a speed of the radar target. In other words, the two-dimensional array R[k, m] (the range map) is Fourier-transformed row by row, i.e. along the "slow" time axis. The resulting Fourier transforms again form an array having N×M spectral values, which is referred to as a range Doppler map X[k, l] (k=0, N−1 and l=0, M−1). As a result of the second FFT, the "slow" time axis becomes the Doppler frequency axis. The associated discrete Doppler frequency values respectively correspond to a specific speed. The Doppler frequency axis can accordingly be converted into a speed axis.

Each local maximum (each peak) in the range Doppler map X[k, l] indicates a potential radar target. The row index k (on the range axis) assigned to a local maximum represents the distance of the target, and the column index l (on the speed axis) assigned to the local maximum represents the speed of the target. It goes without saying that the methodology described here for determining distance and speed of radar targets on the basis of the range Doppler map is a comparatively simple methodology. Depending on the application, use may be made of more complex and further-reaching algorithms for evaluating the range Doppler map. In some applications, it is not necessary to calculate a range Doppler map. In these cases, it is possible to calculate distances and speeds of radar targets e.g. on the basis of the range map, without a range Doppler map having to be calculated beforehand.

In the case of a plurality of RX antennas, it is possible to calculate a range map and a range Doppler map $X_a$[k, l] for each RX channel, wherein a denotes the number of the antenna and of the associated RX channel. The range Doppler maps $X_a$[k, l] can be "stacked" to form a three-dimensional array. Equally the output data $Y_a$[m, n] (radar data arrays) can be regarded as a three-dimensional array. The latter is sometimes referred to as a radar data cube.

As mentioned, the radar data cubes, the resulting range maps $R_a$[k, m] or the range Doppler maps $X_a$[k, l] can be used as input data for various further signal processing methods. By way of example, various peak detection algorithms are known for detecting, in the range maps $R_a$[n, m] or the range Doppler maps $X_a$[k, l], local maxima (peaks) caused by an object (radar target) in the "field of view" of the radar sensor. Other algorithms serve e.g. for calculating the (azimuth) angle of a radar target or for classifying detected radar targets (e.g. whether a radar target is a pedestrian).

Like all measurement data, the spectral values in a range map or a range Doppler map contain noise. The detectability of the abovementioned local maxima and the reliability of the detection depend on the noise floor of the radar system.

Various noise sources can contribute to the noise floor, in particular the phase noise of the local oscillator (see FIG. 4, LO 101). The interference effects on account of other, interfering radar sensors as discussed further above can also adversely influence the detection of radar targets and the robustness and reliability of the measurement results. The interference mentioned can at least temporarily increase the noise floor to such a great extent that detection of radar targets becomes impossible or at least susceptible to errors.

Various techniques for recognizing interference are known. These techniques make it possible to recognize that a measurement was disturbed and the measurement results are therefore unreliable. Other approaches aim to suppress the interference signals or to reduce them by means of filter techniques. The exemplary embodiments described below relate to one possible approach for suppressing interference signal components (cf. equation (3), signal $y_{RF,I}(t)$) by means of a special filter technique. Before various possibilities for eliminating disturbing interference in the baseband signal are discussed, a further example of an RE frontend 10 of a radar sensor will also be explained briefly below, this constituting an alternative implementation to the example from FIG. 5.

Figure 10:
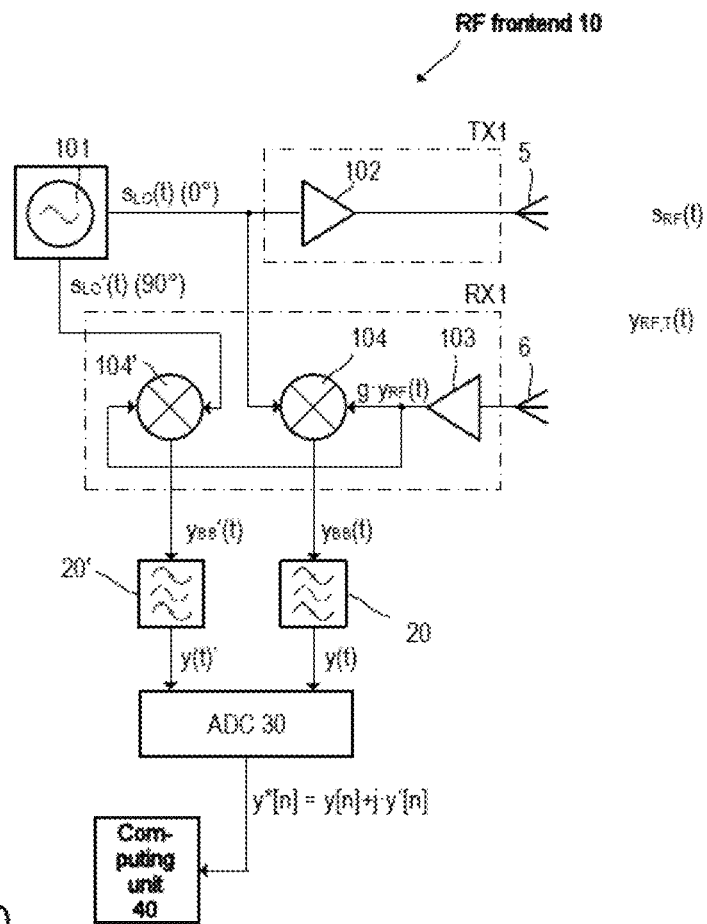
FIG. 10 illustrates a modification of the example from FIG. 5, wherein an IQ mixer is used in the receiving channel in order to obtain a complex baseband signal.

FIG. 10 shows an RE frontend 10 of a radar sensor having an RX channel RX1 and a TX channel TX1. The examples from FIGS. 5 and 9 differ essentially in the implementation of the RX channel RX1, in which, in accordance with FIG. 10, an IQ mixer (IQ demodulator) constructed from two mixers 104 and 104' is used in order to generate a complex mixer output signal $y_{BB}^*(t)=y_{BB}(t)+j \cdot y_{BB}'(t)$ (the symbol j represents the imaginary unit). The real part $y_{BB}(t)$ is also referred to as the in-phase component, and the imaginary part $y_{BB}'(t)$ as the quadrature component. In comparison with the example from FIG. 5, the analog baseband signal processing chain has to be duplicated, i.e. the signal processing chain 20 for the real part and a corresponding signal processing chain 20' for the imaginary part. The output signals y(t) and y'(t) are digitized by means of the analog-to-digital converter unit 30 (having two channels). The digital radar signal (digitized baseband signal) can be regarded as a complex signal $y^*[n]=y[n]+j \cdot y'[n]$ like the mixer output signal $y_{BB}^*(t)$ mentioned above. Analogously to equation 1, the following also holds true for a complex baseband signal (in the digital domain):

$$y^*[n]=y_T^*[n]=+y_I^*[n] \quad (5)$$

wherein $y_T^*[n]$ denotes the signal component on account of echoes at real radar targets and $y_I^*[n]$ denotes the signal component on account of interference of interference signals.

In this example, the local oscillator 101 is configured to feed, in addition to the "normal" LO signal $s_{LO}(t)$, also an LO signal $s_{LO}'(t)$ orthogonal thereto (phase-shifted by 90°), wherein in the RX channel the LO signal $s_{LO}'(t)$ is fed to the reference input of the mixer 104 and the corresponding LO signal $s_{LO}'(t)$ is fed to the reference input of the mixer 104'. The amplified antenna signal $g \cdot y_{RF}(t)$ is fed to the RF inputs of the two mixers 104 and 104'; the resulting mixer output signal, as mentioned, is the complex signal $y_{BB}^*(t)=y_{BB}(t)+j \cdot y_{BB}'(t)$. The subsequent digital signal processing with the use of an IQ mixer is not substantially different than with the use of a "normal" mixer as in the example from FIG. 5. The radar Doppler analysis in the frequency domain as summarized above can also be carried out with complex-valued signals. Radar sensors with IQ mixers in the receiving channel are known per se and will therefore not be discussed in greater detail here.

Figure 11:
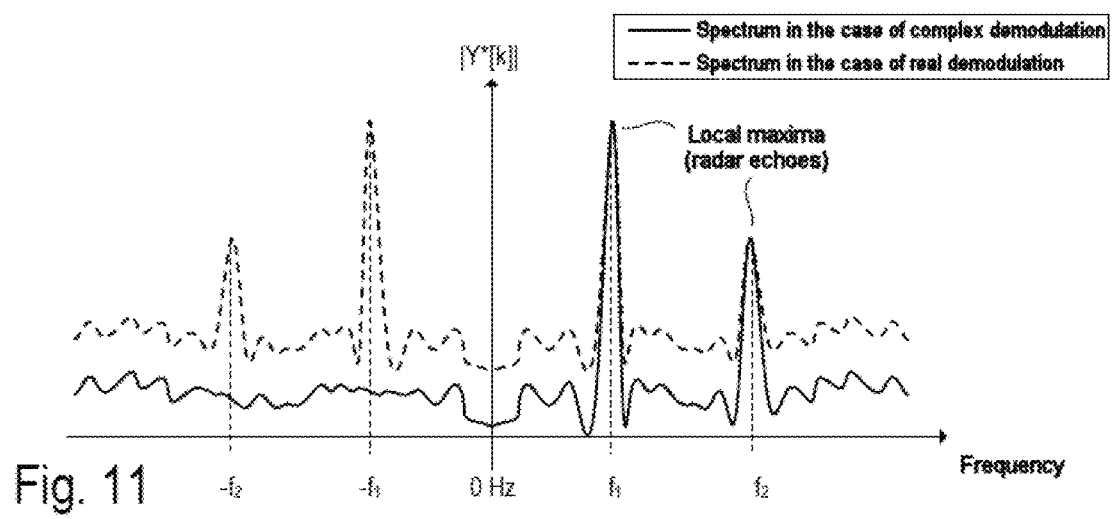
FIG. 11 schematically illustrates the spectrum of a real radar signal and the spectrum of a complex radar signal in baseband.

FIG. 11 illustrates the spectrum of a radar signal in baseband with complex demodulation (by means of an IQ mixer, see FIG. 9) in comparison with the spectrum of a radar signal in baseband with real demodulation (see FIG. 5). Spectra of real signals are always symmetrical, i.e. $|Y[k]|=|Y[-k]|$ and $\arg\{Y[k]\}=-\arg\{Y[-k]\}$, wherein in this example Y[k] is the spectrum of a real baseband signal y[n] (cf. FIG. 5). In contrast thereto, the spectra Y*[k] of complex signals y*[n] are not symmetrical. In the case of complex demodulation by means of an IQ mixer, radar echoes lead only to local maxima in the right-hand portion of the spectrum, i.e. that portion of the spectrum which is assigned to positive frequencies (see FIG. 11, solid line), whereas in the case of the real demodulation, the radar echoes always result in two corresponding local maxima (see FIG. 11, dashed line). That is to say that each radar echo at a target leads to a local maximum at positive frequency $f_1$, $f_2$ and a corresponding local maximum at negative frequency $-f_1$, $-f_2$.

With the use of an IQ mixer for the complex demodulation of the received radar signals (see equation 5), the signal component $y_T^*[n]$ (radar echoes at real targets) has spectral lines only at positive frequencies, whereas the signal component $y_I^*[n]$ (disturbing interference) has spectral lines at positive and negative frequencies. Hereinafter the spectrum of the (complex) signal component $y_T^*[n]$ is designated by $Y_T^*[k]$ and the spectrum of the (likewise complex) signal component $y_I^*[n]$ is designated by $Y_I^*[k]$. On account of the linearity of the Fourier transformation, analogously to equations 1 and 5, the following relationship holds true:

$$Y^*[k]=Y_T^*[k]+Y_I^*[k]. \quad (6)$$

In equation 6, k denotes the frequency index and for the (discrete) frequency fit holds true that $f=k \cdot \Delta f$, wherein $\Delta f$ denotes the frequency resolution in the present example. The (discrete) spectrum Y*[k] can represent for example a column of a range map R[k, m] provided that the range map R[k, m] was calculated on the basis of a complex baseband signal y*[n] (having M segments/chirps).

As mentioned, the signal component $y_T^*[n]$ has spectral lines only at positive frequencies, which spectral lines can represent in each case a real radar target, i.e.

$$|Y_T^*[k]|\approx 0 \text{ for } k<0. \quad (7)$$

Of course, zero is a theoretical value that does not take account of noise. Theoretical work has shown that the signal component $y_I^*[n]$ has a symmetrical absolute value spectrum, i.e.

$$|Y_I^*[k]|=|Y_I^*[-k]| \quad (8)$$

This has the consequence that the spectrum of the interference signals can be "extracted" (estimated) directly from the overall spectrum Y*[k]. The following equation $$|Y_I^*[k]| = \begin{cases} |Y^*[k]| & \text{for } k \leq 0 \\ |Y^*[-k]| & \text{for } k > 0 \end{cases} \quad (9)$$

denotes a sufficient accurate estimation for the absolute value spectrum $|Y_I^*[k]|$ of the signal component $y_I^*[n]$ which represents interference signals.

Theoretical work has further shown that the phase spectrum $\arg\{Y_I^*[k]\}$ of the signal component $y_I^*[n]$ has a parabolic profile, i.e.

$$\arg\{Y_I^*[k]\}=c_1 k^2+c_2 k+c_3, \quad (10)$$

wherein $c_1$, $c_2$ and $c_3$ are constant parameters that can be calculated (estimated) from the spectrum $Y^*[k]$ for $k<0$. Various parameter estimation methods known per se can be used for this purpose, for example the method of least mean squares (LMS method) or the like. For positive frequencies, the phase spectrum in accordance with equation 10 can also be extrapolated for positive frequencies ($k>0$). In general a spectrum $Y^*[k]$ comprises an even number of complex-valued spectral lines; the frequency index $k$ in this case ranges from $-N/2$ to $N/2-1$.

Since both the absolute value spectrum $|Y^*_I[k]|$ (cf. equation 9) and the phase spectrum $\arg\{Y_I^*[k]\}$ (cf. equation 10) of the interference signal component $y_I^*[n]$ have been determined, the interference signal component can be eliminated from the complex radar signal $y^*[n]$, which after all includes radar echoes and interference signals, by means of subtraction (cancelling out). This procedure is carried out in the frequency domain and is illustrated graphically in FIGS. 12 to 14, wherein absolute value spectrum and phase spectrum of the interference signal component $y_I^*[n]$ are estimated separately. The approach described below relates to interference signal suppression in the frequency domain for a complex baseband signal $y^*[n]$. Alternative approaches that are also suitable for interference signal suppression in a real baseband signal $y^*[n]$ are discussed further below. Upon closer consideration, at positive frequencies an additional linear phase term $\exp(j\varphi')$ also has to be taken into account, wherein the linear phase $\varphi'$ can be determined for example by solving a minimizing problem. In other words, $\varphi'$ is that phase $\varphi$ (in the range of from 0 to $2\pi$) for which the expression $\|Y^*[k]-|Y_I^*[k]|\exp(j(c_1k^2+c_2k+c_3))\exp(j\varphi)\|$ for $k>0$ becomes minimal. In this case, equation 10 holds true only for negative frequencies and the additional linear phase is added for positive frequencies, i.e.

$$\arg\{Y_I^*[k]\} = \begin{cases} c_1k^2 + c_2k + c_3 & \text{for } k \leq 0 \\ c_1k^2 + c_2k + c_3 + \varphi' & \text{for } k > 0 \end{cases} \quad (11)$$

Figure 12:
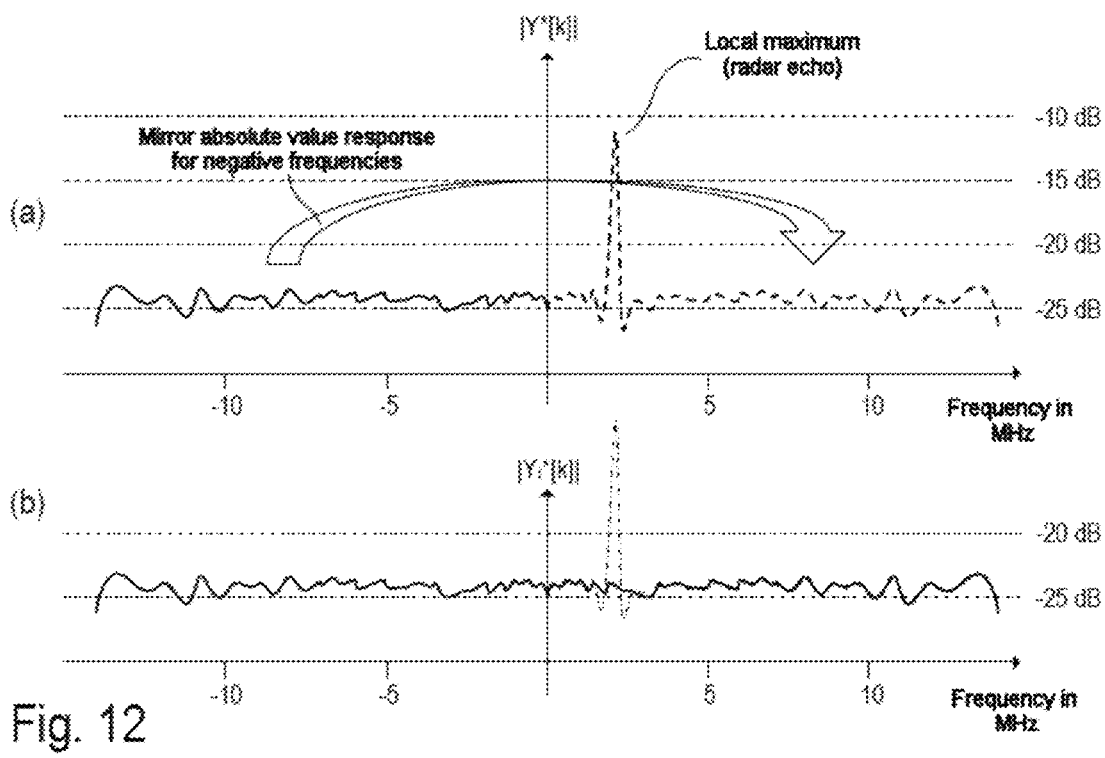
FIG. 12 schematically illustrates the estimation of the absolute value spectrum of interfering interference signals.

The interference signal suppression is carried out separately for each segment of the digitized baseband signal $y'[n]$. That is to say that, for the following explanations, $Y^*[k]$ denotes the spectrum of an individual segment of the complex baseband signal $y^*[n]$, for example a column of a range map $R(k, m)$, i.e. $Y^*[k]=R[k, m]$. As mentioned, m denotes one of M segments of the baseband signal $y^*[n]$, wherein each segment is assigned to a chirp of a chirp sequence ($m=0, \ldots, M-1$). Diagram (a) in FIG. 12 shows by way of example the spectrum $Y^*[k]$ of a segment of the baseband signal $y^*[n]$. The spectrum $Y^*[k]$ comprises a first portion (left-hand side of the spectrum), which is assigned to negative frequencies, and a second portion (right-hand side of the spectrum), which is assigned to positive frequencies. In FIG. 12, diagram (a), the right-hand portion of the spectrum is illustrated as a dashed line. As mentioned, echoes at real radar targets are always manifested as a local maximum (Peak) at a positive frequency, whereas interference on account of interference signals appears in both parts of the spectrum (i.e. at positive and negative frequencies). That is to say that the left-hand portion of the spectrum $Y^*[k]$ does not contain echo signals generated from real radar targets, but rather only noise and interference. On account of the symmetry of the absolute value spectrum $|Y_I^*[k]|$ of the interference signal component $y_I^*[n]$ (see equation 8), the right-hand portion (assigned to positive frequencies) of the absolute value spectrum $Y_I[k]$ can be approximated by "mirroring" the left-hand portion (assigned to negative frequencies) of the spectrum $Y^*[k]$ about the axis $k=0$. The aforementioned mirroring is often also referred to as "flipping". In some programming languages there are even specific commands for this operation, such as e.g. "fliplr" ("flip from left to right").

That is to say that the mirrored absolute value spectrum $|Y^*[-k]|$ of the currently considered segment of the baseband signal $y^*[n]$ is a suitable estimation for the absolute value spectrum $|Y_I^*[k]|$ of the interference signal component $y_I^*[n]$ for positive frequencies ($k>0$), whereas the (non-mirrored) absolute value spectrum $|Y^*[k]|$ of the currently considered segment of the baseband signal $y^*[n]$ is a suitable estimation for the absolute value spectrum $|Y_I^*[k]|$ of the interference signal component $y_I^*[n]$ for negative frequencies ($k<0$). The estimated absolute value spectrum $|Y_I^*[k]|$ of the interference signal component $y_I^*[n]$ is illustrated in diagram (b) in FIG. 12. The local maximum on account of a real radar echo that is present in diagram (a) in FIG. 12 is no longer contained in diagram (b) (and is now merely indicated by a thin dash-dotted line); diagram (b) represents only the absolute value spectrum $|Y_I^*[k]|$ of the interference signal component $y_I^*[n]$.

Figure 13:
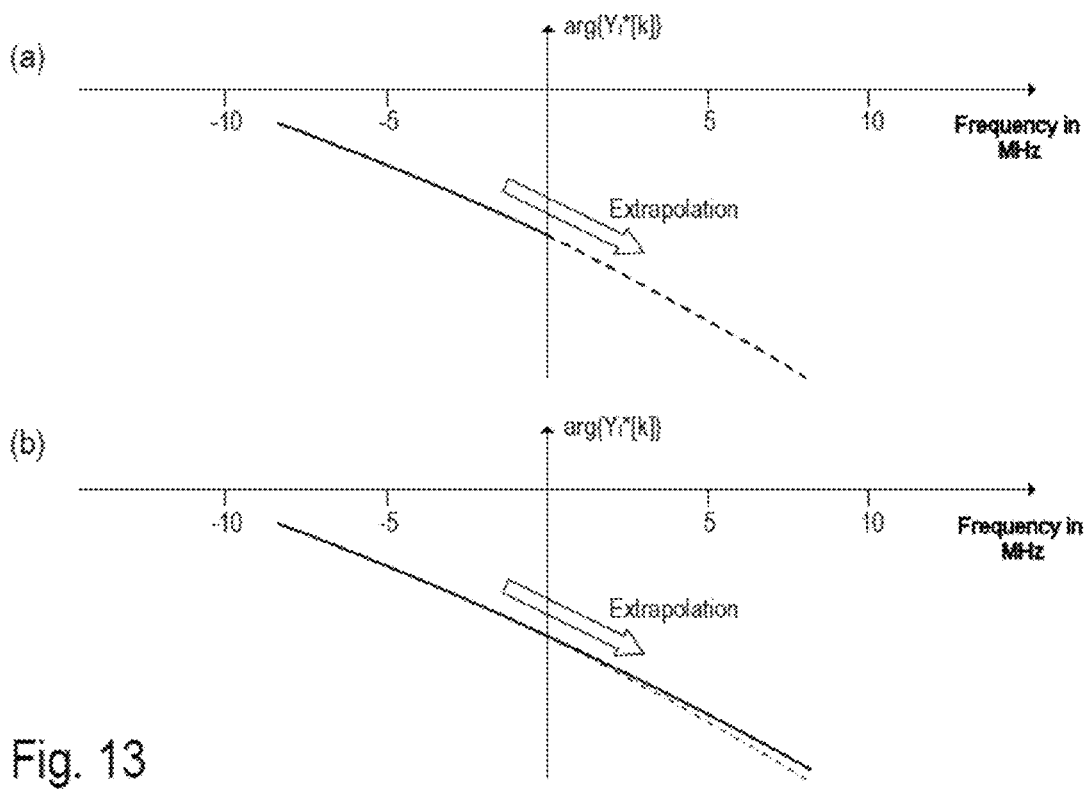
FIG. 13 schematically illustrates the estimation of the phase spectrum of interfering interference signals.

Cancelling the interference signal component $y_I^*[n]$ in the baseband signal $y^*[n]$ requires both the absolute value spectrum $|Y_I^*[k]|$ and the phase spectrum $\arg\{Y_I^*[k]\}$. As mentioned, the phase spectrum $\arg\{Y_I^*[k]\}$ can be modelled as a second degree polynomial (see equations 10 and 11). The parameters of this model can be estimated from the left-hand portion (assigned to negative frequencies) of the phase spectrum $\arg\{Y^*[k]\}$ (i.e. for $k<0$) and the estimated model parameters (see equation 10, parameters $c_1$, $c_2$, and $c_3$) can be used to extrapolate the right-hand portion (assigned to positive frequencies) of the phase spectrum $\arg\{Y^*[k]\}$ (i.e. for $k>0$), wherein an additional linear phase term is also taken into account in the right-hand portion of the phase spectrum (see equation 11). This extrapolation is illustrated in FIG. 13. Diagram (a) from FIG. 13 shows the phase spectrum $\arg\{Y^*[k]\}$, wherein the right-hand portion of the phase spectrum $\arg\{Y^*[k]\}$ (which can also be influenced by real radar echoes) is illustrated in a dashed manner. Diagram (b) from FIG. 13 shows the extrapolated phase spectrum $\arg\{Y^*_I[k]\}$ of the interference signal component $y_I^*[n]$.

Figure 14:
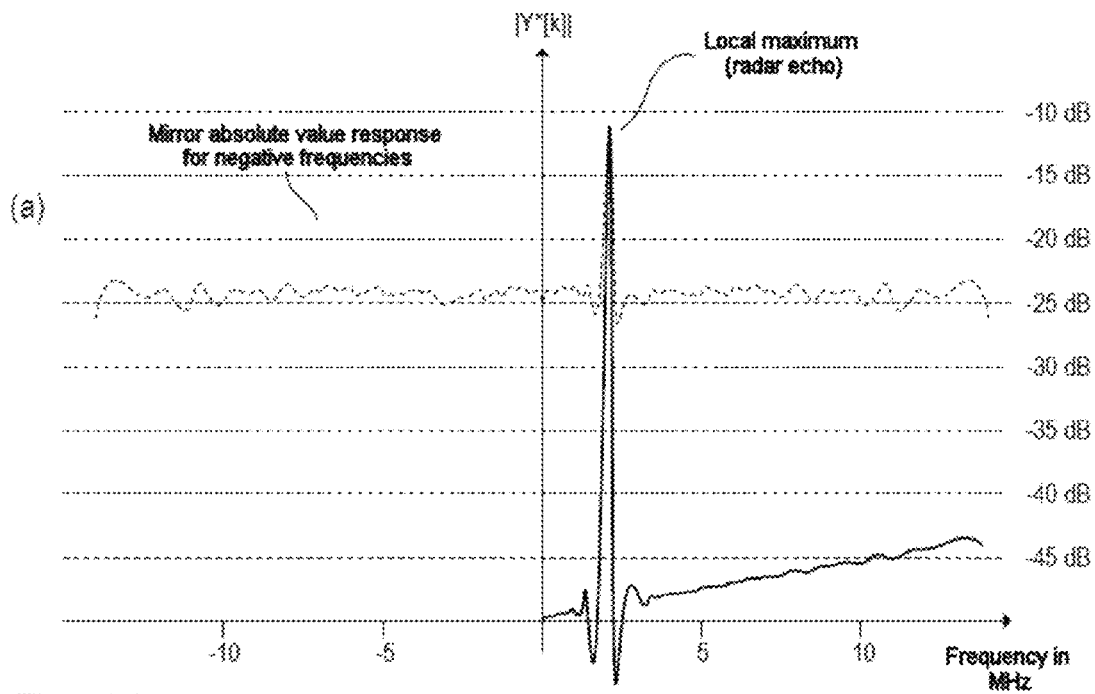
FIG. 14 illustrates the cancellation (in the frequency domain) of the interfering interference signals in the baseband signal.

FIG. 14 illustrates the absolute value of the modified/corrected spectrum $Y^*_{corr}[k]=^*[k]-Y_I^*[k]$, in which the interference signal component has been cancelled. The interference signal component is cancelled by means of a simple subtraction in the frequency domain, i.e.

$$Y^*_{corr}[k]=Y^*[k]-Y_I^*[k]. \quad (12)$$

As mentioned, the interference signal component $y_I^*[n]$ in the frequency domain can be implemented separately for each segment of the baseband signal $y^*[n]$. The interference signal components can thus be cancelled column by column, with a range map $R[k, m]$ for each column, wherein a range map $R[k, m]$ can be determined for each chirp sequence and each receiving channel.

Figure 15:
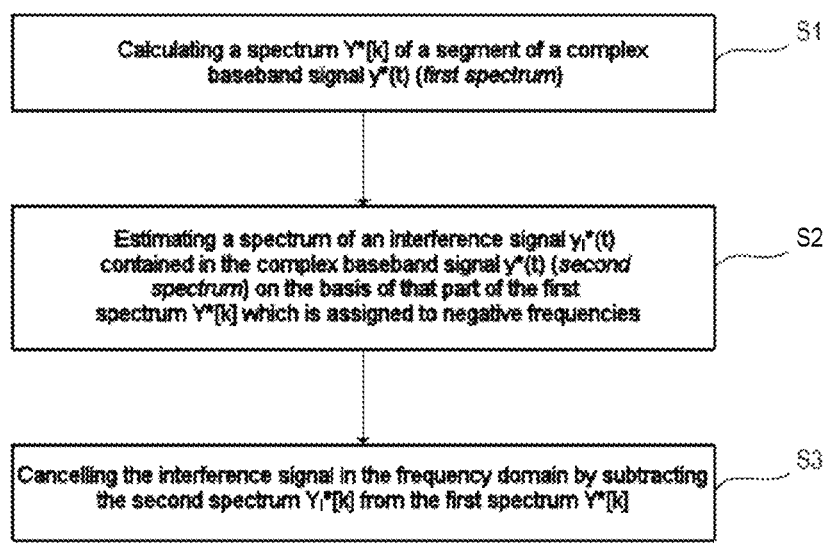
FIG. 15 is a flow diagram for summarizing the approach described here for cancelling the interference in the baseband radar signal.

A summary is given below of one example of the method described here for cancelling interference signal components $y^*_I[n]$ caused by interference in a complex baseband signal $y^*[n]$ of a radar transceiver. FIG. 15 visualizes the example with the aid of a flowchart. As input signal, the method uses a complex baseband signal $y^*[n]$ of a radar transceiver with IQ mixer in the receiving channel (see FIG. 10). Said baseband signal $y^*[n]$ comprises a multiplicity of segments, wherein each segment corresponds to a chirp of a chirp sequence contained in the emitted RF radar signal. As was explained further above with reference to FIG. 9, the samples of the baseband signal y*[n] can be organized as a matrix, wherein each column of the matrix includes a segment. In accordance with FIG. 15, the method comprises calculating the spectrum Y*[k] (first spectrum) of a segment of the complex baseband signal y*(t) (see FIG. 15, step S1). This calculation can be carried out in the course of the calculation—described further above—of a range map. A range map contains, in the columns, the spectra of (temporally directly) successive segments of the complex baseband signal y*[n].

The cancelling of the interference signal component mentioned is carried out segment by segment. The next step (see FIG. 15, step S2) involves estimating the spectrum $Y^*_I[k]$ (second spectrum) of the interference signal component $y_I^*[n]$ (generated by interference) contained in the baseband signal segment considered; this estimation is based on that portion of the first spectrum Y*[k] which is assigned to negative frequencies (i.e. Y*[k] for k<0). A third step (see FIG. 15, step S3) involves cancelling the interference signal component $y_I^*[n]$ contained in the complex baseband signal segment y*[n] in the frequency domain. This cancelling is achieved by subtracting the estimated second spectrum $Y_I^*[k]$ from the first spectrum Y*[k] (see also equation 11). It goes without saying that cancelling in practice is not understood to be complete elimination of the interference, but a significant reduction of the interfering interference signal power is achieved.

The estimation of the second spectrum $Y_I^*[k]$ is done separately for the absolute value spectrum $|Y_I^*[k]|$ and the phase spectrum $\arg\{Y_I^*[k]\}$. The absolute value spectrum $|Y_I^*[k]|$ is obtained by mirroring the left-hand portion (negative frequencies) of the absolute value of the first spectrum $|Y_I^*[k]|$. The phase spectrum $\arg\{Y_I^*[k]\}$ is obtained by means of a model-based extrapolation of the left-hand portion (negative frequencies) of the phase spectrum $\arg\{Y^*[k]\}$ (see equations 10 and 11).

The method described above presupposes a complex baseband signal y*[n], for which an RF frontend with an IQ mixer is required. A description is given below of a modification of the approach described above, which can also be applied to a real baseband signal y[n] and thus also functions for RF frontends with a simple mixer. The cancelling of the interference is based analogously to equation 11—on the subtraction of an estimation of the spectrum $Y_I[k]$ of the real interference signal component $y_I[n]$ from the calculated spectrum Y[k] of the real baseband signal y[n], i.e.

$$Y_{corr}[k]=Y[k]-Y_I[k]. \quad (13)$$

Figure 16:
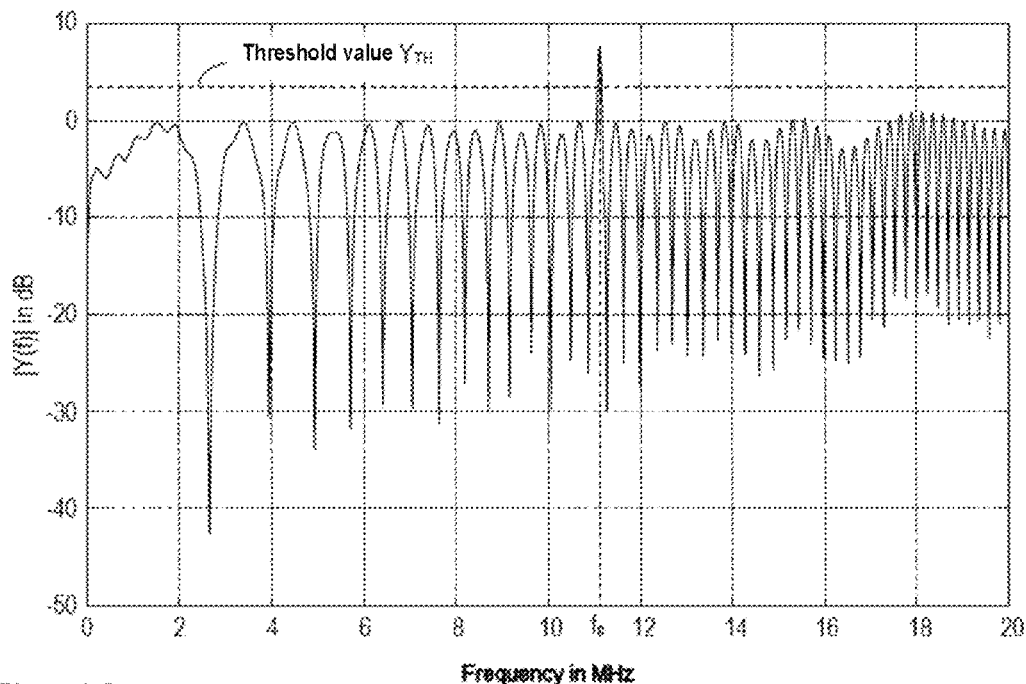
FIGS. 16 to 18 illustrate the interference signal estimation and reduction in the absolute value spectrum for real baseband signals.

As already explained, the spectra of real signals are always symmetrical with respect to the zero hertz line (cf. FIG. 11 and the associated explanations). That is to say that the absolute value spectrum |Y[k]| is identical for positive and negative frequencies (|Y[k]|=|Y[−k]|), and from the absolute value spectrum |Y[k]| both the portion assigned to negative frequencies and the portion assigned to positive frequencies contain interference signal components spectrum $|Y_I[k]|$, interference) and useful signal components (spectrum $|Y_T[k]|$, real radar echoes). One example of the absolute value spectrum |Y[k]| is illustrated in FIG. 16. A local maximum (Peak) representing a real radar echo is evident approximately at 11 MHz.

Before an estimated value for the spectrum $Y_I[k]$ of the real interference signal component $y_I[n]$ is determined, firstly the local maxima are detected in the calculated absolute value spectrum |Y[k]| (e.g. a column of a range map), which local maxima can be assigned to real radar echoes. This detection can be carried out, as illustrated by way of example in FIG. 16, by means of a comparison with a threshold value $Y_{TH}$, that is to say that those frequency indices $k_p$ (frequency bins, correspond respectively to a frequency $f_p$) for which $|Y[k_p]|>Y_{TH}$ holds true are identified. These frequency bins $k_p$ (and possibly adjacent bins) that are assignable to a real radar echo are not taken into account in the estimation of the interference signal spectrum $Y_I[k]$. In the diagram illustrated in FIG. 16, a local maximum (Peak) can be identified (at approximately $f_p$=11 MHz), whereas the remaining frequency bins are dominated by interference and noise. The result of the threshold value comparison may be a set P of frequency indices assigned to real radar echoes. In the case of FIG. 16, the set P may appear e.g. as follows:

$$P=\{k_p-2,k_p-1,k_p,k_p+1,k_p+2\}.$$

Figure 17:
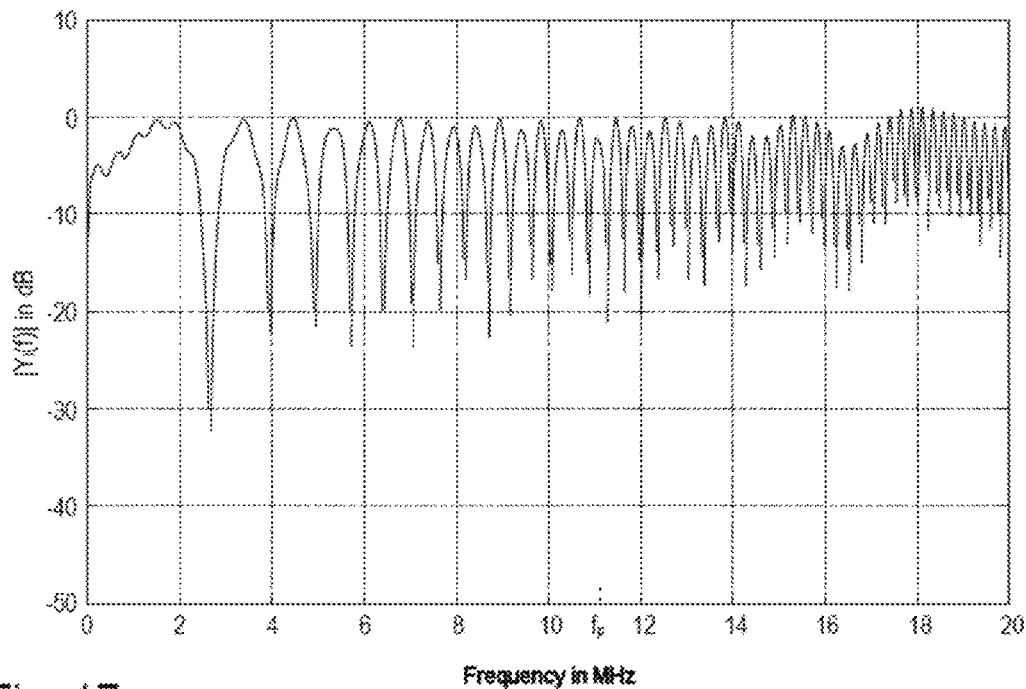
Figure 18:
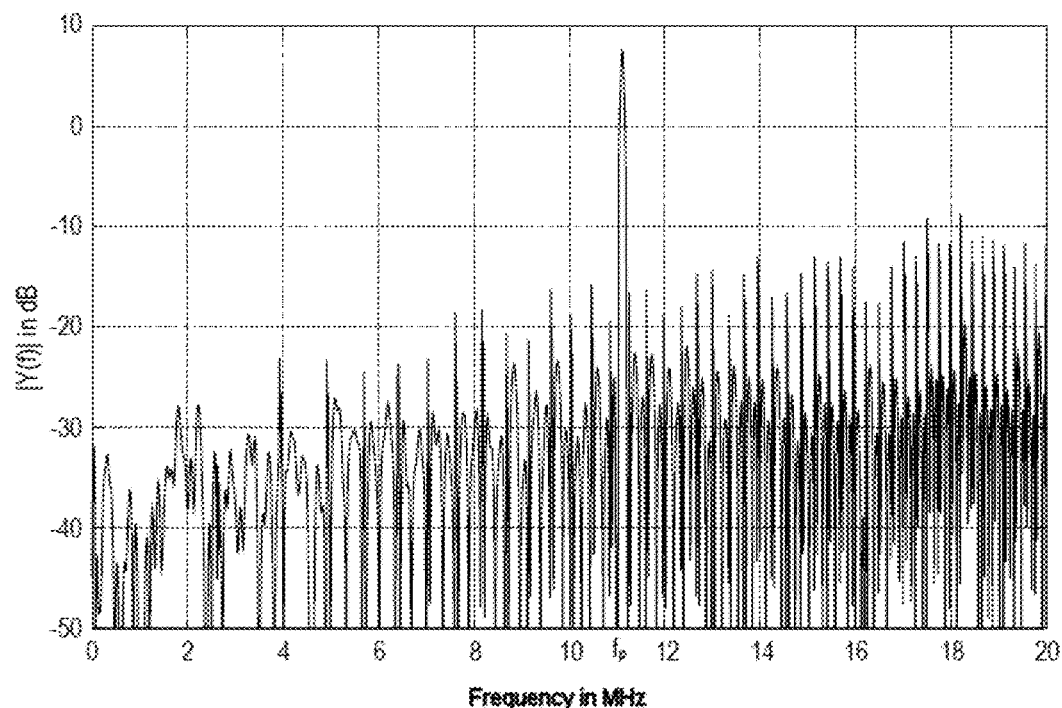

The estimation of the interference signal spectrum $Y_I[k]$ is based on the calculated spectrum Y[k] of the real baseband signal (e.g. a column of a range map), wherein those frequency ranges (frequency bins) which can be assigned to a radar echo are disregarded. That is to say that, for the frequency bins $k \neq k_p$, the absolute value spectrum is approximated as follows:

$$|Y_I[k]|\approx|Y[k]|, \text{ for } k \notin P, \quad (14)$$

wherein the "gaps" in the case of the frequency bins k∈P are closed by means of interpolation. Various interpolation methods known per se are applicable here, for example an interpolation by means of cubic splines. However, other methods known per se are also applicable. One example of the estimated absolute value spectrum $|Y_I[k]|$ can be seen in FIG. 17. FIG. 18 shows the difference $|Y[k]-Y_I[k]|$ (cf. equation 13).

Figure 19:
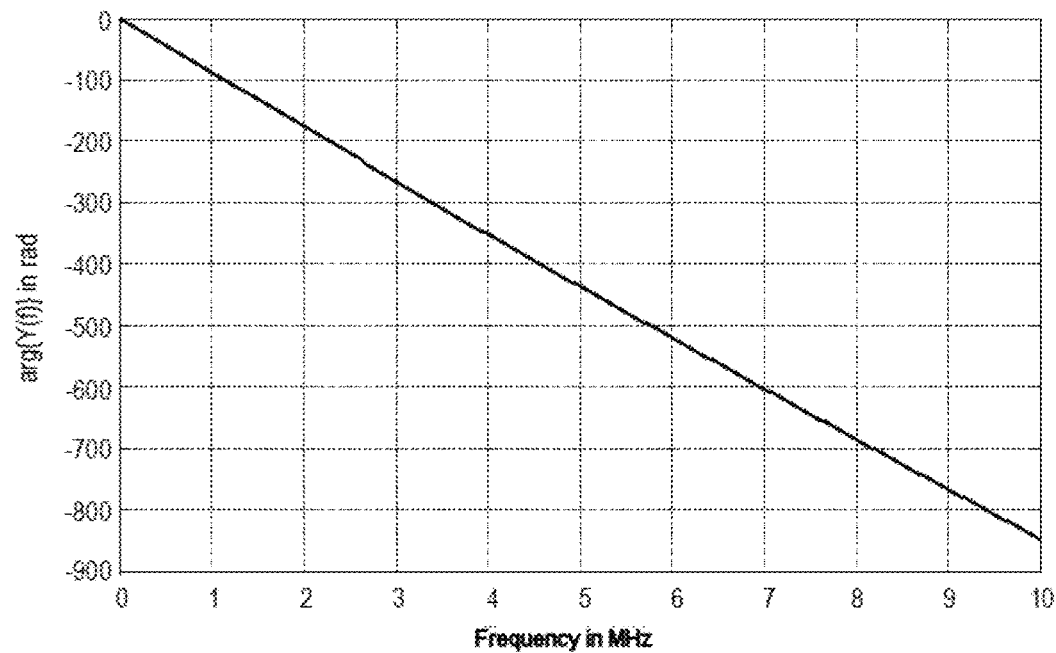
FIGS. 19 to 21 illustrate the interference signal estimation and reduction in the phase spectrum for real baseband signals.
Figure 20:
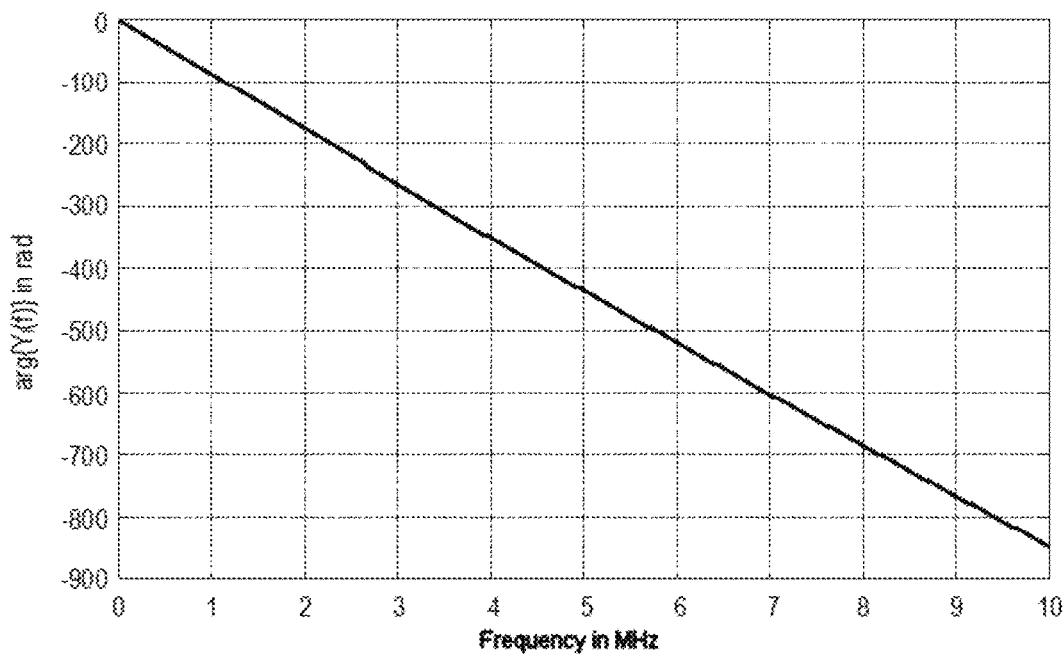
Figure 21:
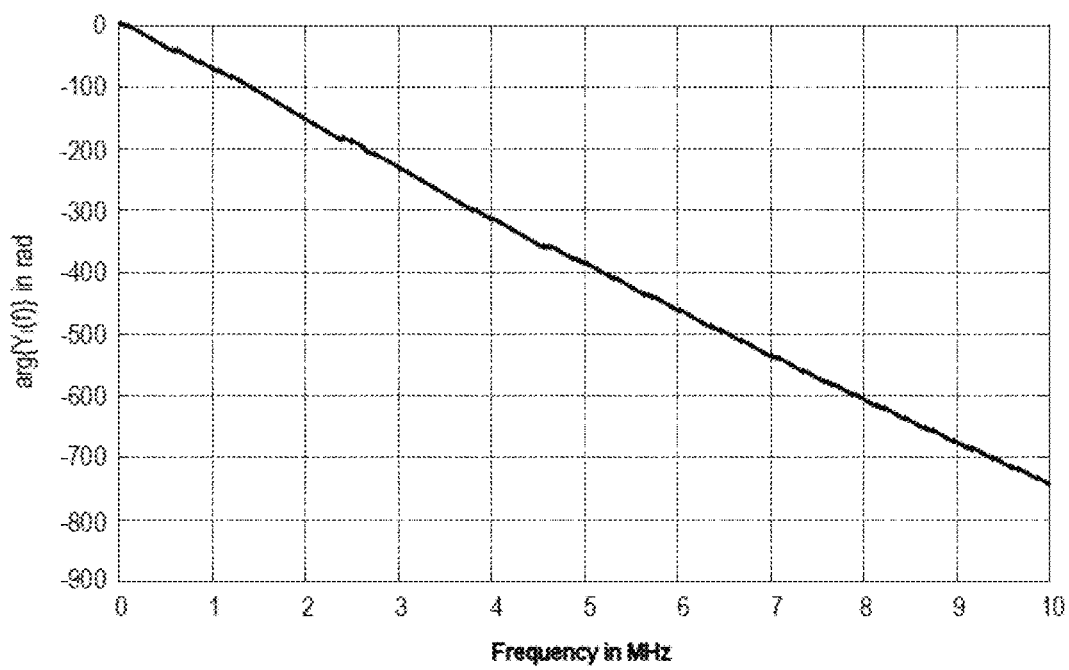

An estimated value for the phase spectrum $\arg\{Y_I[k]\}$ can be ascertained by means of a piecewise linear interpolation in the previously calculated phase spectrum $\arg\{Y[k]\}$, for $k \neq k_p$. In the case of frequency bins $k_z$ for which (or in the vicinity of which) the absolute value spectrum has a zero, the value in the phase spectrum $\arg\{Y[k]\}$ may be unreliable. Accordingly, during the calculation of the estimated value, those frequency ranges $k_p$ (frequency bins) which can be assigned to a radar echo and those frequency bins $k_z$ which can be assigned to zeros can be disregarded. FIG. 19 shows by way of example the phase spectrum $\arg\{Y[k]\}$ associated with FIG. 16; FIG. 20 shows the piecewise linearly interpolated phase spectrum $\arg\{Y_I[k]\}$. In accordance with a further example, the phase spectrum $\arg\{Y_I[k]\}$ can be calculated as a regression line on the basis of the phase spectrum $\arg\{Y[k]\}$ (e.g. column of a range map) for $k \neq k_p$ and $k \neq k_z$. In other words, spectral lines $Y[k_p]$ and possibly $Y[k_z]$ are disregarded for the calculation of the estimated value for $\arg\{Y[k]\}$. FIG. 21 shows the difference $\arg\{Y[k]-Y_I[k]\}$.

Figure 22:
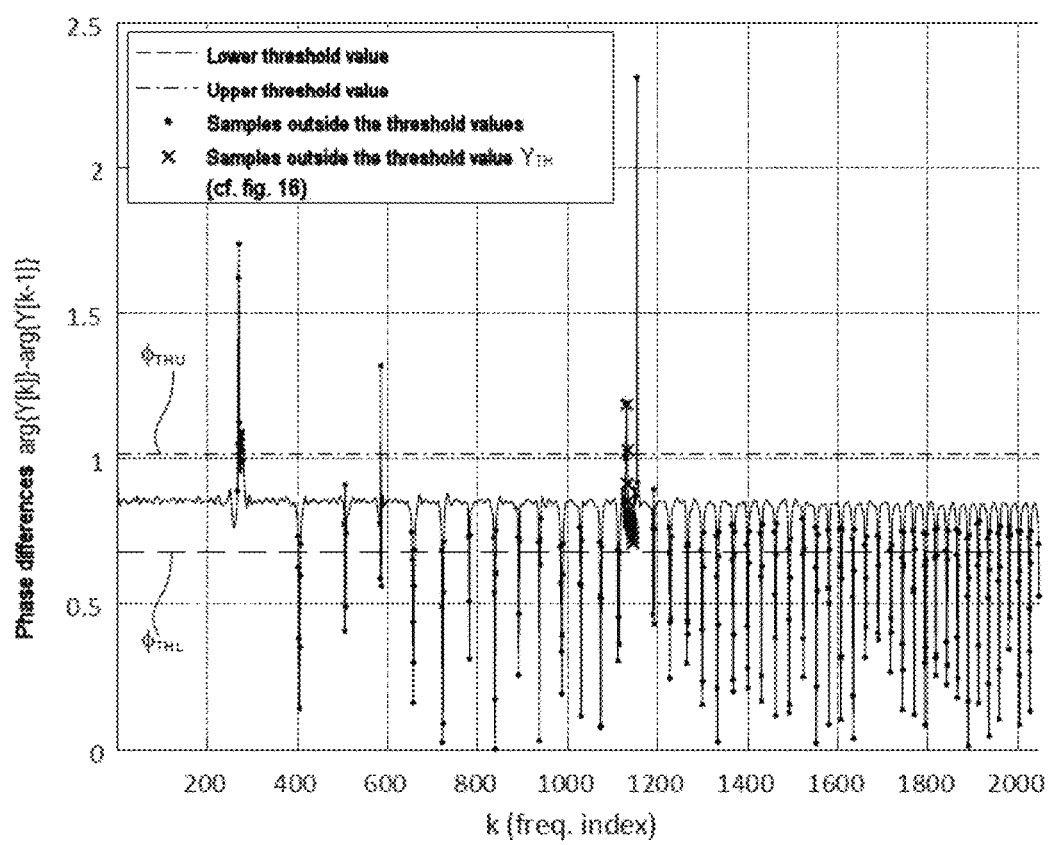
FIG. 22 illustrates the detection of zeros in the phase spectrum for real baseband signals.

FIG. 22 illustrates by way of example a possibility for identifying those frequency bins $k_z$ which can be assigned to a zero. The angle differences, that is to say $\arg\{Y[k]\}-\arg\{Y[k-1]\}$, are represented on the ordinate axis. Since sudden phase changes occur in the case of zeroes, local minima and maxima become evident in the case of the zeroes and can likewise be detected by means of a comparison with a threshold value $\varphi_{THL}$ and $\varphi_{THU}$, respectively. The frequency bins $k_z$ at which a zero is detected can be disregarded in the approximation of the phase spectrum $\arg\{Y_I[k]\}$. In one exemplary embodiment, at the detected zeroes, the absolute value spectrum $|Y_I[k]|$ can also be set to zero. In addition to the frequency bins $k_z$ at which the phase lies outside the range of $\varphi_{THL}$ to $\varphi_{THU}$, adjacent frequency bins (e.g. $k_z-2$, $k_z-1$, $k_z$, $k_z+1$ and $k_z+2$) can also be defined as being associated with the zero and be disregarded in the approximation of the phase spectrum arg$\{Y_I[k]\}$. For this reason, in FIG. 22 points are also depicted as "outside the threshold values" even though they lie between the threshold values $\varphi_{THL}$ to $\varphi_{THU}$ but adjoin a frequency bin whose phase value lies outside. How many frequency bins around a zero are "sorted out" in this way is dependent on the actual implementation and may also be dependent on the numerical accuracy of the calculations.

The methods and concepts for the signal processing of digital radar signals as described here can be implemented in various ways. In the exemplary embodiments described here, the concepts described here for reducing interference signals caused by interference are implemented as software that is executed in a computing unit by means of one or more processors (see FIG. 3, controller 50, signal processor 40). It goes without saying that the methods described here can also be implemented in part directly by means of dedicated hardware. In this context, computing unit is understood to mean any functional unit (entity), which can comprise software and hardware, which is suitable and configured for carrying out the method steps described here. Particularly for the transformation of signals into the frequency domain by means of FFT, efficient hardware structures are also known alongside software algorithms. It should also be emphasized at this juncture that the range maps and range Doppler maps mentioned here need not necessarily be represented as a two-dimensional data structure. The actual structure used may deviate from the structure described here, depending on the implementation.

What is claimed is:

1. A method, comprising:
    emitting a first radio frequency (RF) radar signal containing a chirp sequence;
    receiving a second RF radar signal;
    down-converting the second RF radar signal from an RF band into a baseband by an IQ mixer in order to obtain a complex baseband signal comprising an in-phase component and a quadrature component that is phase shifted by the IQ mixer from the in-phase component by 90°;
    converting the complex baseband signal into a complex digital baseband signal;
    applying a first fast Fourier transform (FFT) to the complex digital baseband signal to calculate a first spectrum that represents a spectrum of a segment of the complex baseband signal, wherein the segment is assigned to a specific chirp of the chirp sequence contained in the first RF radar signal;
    estimating a second spectrum, which represents a spectrum of an interference signal contained in the complex baseband signal, based on a portion of the first spectrum that is located at negative frequencies; and
    subtracting the second spectrum from the first spectrum to suppress the interference signal in the first spectrum to generate a compensated spectrum,
    wherein the first spectrum includes first spectral lines corresponding to radar echoes and second spectral lines corresponding to the interference signal, wherein the first spectral lines are located only at positive frequencies and the second spectral lines are located at negative frequencies and positive frequencies, wherein each second spectral line located at a negative frequency corresponds to a different second spectral line located at a positive frequency, and
    wherein estimating the second spectrum includes generating the second spectrum based on the second spectral lines that are located at the negative frequencies, including extracting the second spectral lines that are located at the negative frequencies, and mirroring the extracted second spectral lines to generate corresponding spectral lines that are located at positive frequencies, wherein the second spectrum includes the extracted second spectral lines that are located at the negative frequencies and the generated corresponding spectral lines that are located at positive frequencies.

2. The method as recited in claim 1, wherein:
    the first spectrum comprises a first absolute value spectrum and a first phase spectrum,
    the second spectrum comprises a second absolute value spectrum and a second phase spectrum, and
    estimating the second spectrum comprises:
    using a portion of the first absolute value spectrum that is assigned to negative frequencies as an estimated value for a portion of the second absolute value spectrum that is assigned to positive frequencies.

3. The method as recited in claim 2, wherein:
    the estimated value for the portion of the second absolute value spectrum that is assigned to positive frequencies is generated by determining an absolute value spectrum corresponding to a mirroring of the portion of the first absolute value spectrum that is assigned to negative frequencies.

4. The method as recited in claim 2, wherein estimating the second spectrum further comprises:
    calculating a portion of the second phase spectrum that is assigned to positive frequencies by extrapolating a portion of the first phase spectrum that is assigned to negative frequencies.

5. The method as recited in claim 1, further comprising:
    subtracting the estimated second spectrum from a portion of the first spectrum that is assigned to positive frequencies in order to obtain a modified segment.

6. The method as recited in claim 5, further comprising:
    using the modified segment for detecting radar targets.

7. The method as recited in claim 1, further comprising:
    applying a second FFT to the compensated spectrum, wherein the first FFT is a range FFT and the second FFT is a Doppler FFT.

8. The method as recited in claim 1, wherein the corresponding spectral lines that are located at positive frequencies are estimates of the second spectral lines located at the positive frequencies.

9. A radar device, comprising:
    a radar transceiver having an oscillator configured to generate a first radio frequency (RF) radar signal containing a chirp sequence, and having a receiving channel comprising an IQ mixer configured down-convert a second RF radar signal from an RF band into a baseband in order to generate a complex baseband signal comprising an in-phase component and a quadrature component that is phase shifted by the IQ mixer from the in-phase component by 90°, wherein the complex baseband signal comprises a plurality of segments and each segment is assigned to a specific chirp of the chirp sequence;
    an analog-to-digital converter (ADC) configured to convert the complex baseband signal into a complex digital baseband signal; and
    at least one processor configured to:

apply a first fast Fourier transform (FFT) to the complex digital baseband signal to calculate a first spectrum that represents a spectrum of a segment of the complex baseband signal;

estimate a second spectrum, that represents a spectrum of an interference signal contained in the complex baseband signal, based on a portion of the first spectrum that is located at negative frequencies; and subtract the second spectrum from the first spectrum to suppress the interference signal in the first spectrum to generate a compensated spectrum, wherein the first spectrum includes first spectral lines corresponding to radar echoes and second spectral lines corresponding to the interference signal, wherein the first spectral lines are located only at positive frequencies and the second spectral lines are located at negative frequencies and positive frequencies, wherein each second spectral line located at a negative frequency corresponds to a different second spectral line located at a positive frequency, and wherein the at least one processor is configured to estimate the second spectrum by generating the second spectrum based on the second spectral lines that are located at the negative frequencies, including extracting the second spectral lines that are located at the negative frequencies, and mirroring the extracted second spectral lines to generate corresponding spectral lines that are located at positive frequencies, wherein the second spectrum includes the extracted second spectral lines that are located at the negative frequencies and the generated corresponding spectral lines that are located at positive frequencies.

10. The radar device as recited in claim 9, wherein:
the at least one processor is further configured to carry out subtraction of the estimated second spectrum from a portion of the first spectrum that is assigned to positive frequencies in order to obtain a modified segment having a reduced interference signal component.

11. The radar device as recited in claim 10, wherein the at least one processor is further configured to use the modified segment for detecting radar targets.

12. A method, comprising:
emitting a first radio frequency (RF) radar signal containing a chirp sequence;
receiving a second RF radar signal;
down-converting the second RF radar signal from an RF band into a baseband by an IQ mixer in order to obtain a complex baseband signal comprising an in-phase component and a quadrature component that is phase shifted by the IQ mixer from the in-phase component by 90°;
converting the complex baseband signal into a complex digital baseband signal;
applying a first fast Fourier transform (FFT) to the complex digital baseband signal to calculate a first spectrum that represents a spectrum of a segment of the complex baseband signal, wherein the segment is assigned to a specific chirp of the chirp sequence contained in the first RF radar signal;
identifying spectral lines in the first spectrum that are assigned to a radar echo as those spectral lines in the first spectrum having an absolute value that exceeds a threshold value; and
determining a second spectrum, that represents an estimated value for a spectrum of an interference signal contained in the complex baseband signal, based on the first spectrum, wherein the spectral lines that are assigned to the radar echo are disregarded when determining the second spectrum.

13. The method as recited in claim 12, wherein identifying the spectral lines that are assigned to the radar echo comprises:
determining which spectral lines of the first spectrum have an absolute value that exceeds a threshold value.

14. The method as recited in claim 12, wherein:
the first spectrum comprises a first absolute value spectrum and a first phase spectrum,
the second spectrum comprises a second absolute value spectrum and a second phase spectrum, and
determining the second spectrum further comprises:
using the first absolute value spectrum as an approximation for the second absolute value spectrum, wherein the spectral lines that are assigned to the radar echo are replaced by interpolated values.

15. The method as recited in claim 14, wherein determining the second spectrum further comprises:
determining the second phase spectrum by linear interpolation into the first phase spectrum, wherein phases of the spectral lines that are assigned to the radar echo are disregarded.

16. The method as recited in claim 12, wherein:
spectral lines that are assigned to a zero are disregarded when determining the second spectrum.

17. The method as recited in claim 12, wherein determining the second spectrum incudes:
removing the spectral lines from the first spectrum; and
closing each gap in the first spectrum created by a removal of the spectral lines from the first spectrum to generate the second spectrum.

18. The method as recited in claim 17, wherein closing each gap in the first spectrum comprises interpolating the first spectrum that has the spectral lines removed therefrom.

19. The method as recited in claim 12, further comprising:
subtracting the second spectrum from the first spectrum to suppress the interference signal in the first spectrum to generate a compensated spectrum.

20. The method as recited in claim 19, further comprising:
applying a second FFT to the compensated spectrum, wherein the first FFT is a range FFT and the second FFT is a Doppler FFT.

21. A radar device, comprising:
a radar transceiver having an oscillator configured to generate a first radio frequency (RF) radar signal containing a chirp sequence, and having a receiving channel comprising an IQ mixer configured down-convert a second RF radar signal from an RF band into a baseband in order to generate a complex baseband signal comprising an in-phase component and a quadrature component that is phase shifted by the IQ mixer from the in-phase component by 90°, wherein the complex baseband signal comprises a plurality of segments and each segment is assigned to a specific chirp of the chirp sequence;
an analog-to-digital converter (ADC) configured to convert the complex baseband signal into a complex digital baseband signal; and
at least one processor configured to:
apply a first fast Fourier transform (FFT) to the complex digital baseband signal to calculate a first spectrum that represents a spectrum of a segment of the complex baseband signal;

identify spectral lines in the first spectrum that are assigned to a radar echo as those spectral lines in the first spectrum having an absolute value that exceeds a threshold value;

determine a second spectrum, which represents an estimated value for the spectrum of an interference signal contained in the baseband signal, based on the first spectrum, wherein the spectral lines that are assigned to the radar echo are disregarded when determining the second spectrum.

* * * * *